(12) United States Patent
Bixler et al.

(10) Patent No.: US 11,805,130 B1
(45) Date of Patent: Oct. 31, 2023

(54) SYSTEMS AND METHODS FOR SECURED DATA AGGREGATION VIA AN AGGREGATION DATABASE SCHEMA

(71) Applicant: Skill Survey, Inc., Berwyn, PA (US)

(72) Inventors: Ray Bixler, Downington, PA (US);
Randy Bitting, Isle of Palms, SC (US);
Michelle Reed, Downington, PA (US);
Cynthia Hedricks, Princeton, NJ (US);
Steve Heister, West Deptford, NJ (US);
Susan Mockenhaupt, Yardley, PA (US); Disha Deepak Rupayana, Washington Crossing, PA (US)

(73) Assignee: Skill Survey, Inc., Berwyn, PA (US)

( * ) Notice: Subject to any disclaimer, the term of this patent is extended or adjusted under 35 U.S.C. 154(b) by 0 days.

(21) Appl. No.: 17/966,412

(22) Filed: Oct. 14, 2022

Related U.S. Application Data

(63) Continuation of application No. 16/926,294, filed on Jul. 10, 2020, now abandoned.

(60) Provisional application No. 62/872,432, filed on Jul. 10, 2019.

(51) Int. Cl.
| | |
|---|---|
| *G06F 16/31* | (2019.01) |
| *G06F 16/335* | (2019.01) |
| *H04L 9/40* | (2022.01) |
| *G06F 16/735* | (2019.01) |
| *G06F 16/955* | (2019.01) |

(52) U.S. Cl.
CPC ............ *H04L 63/104* (2013.01); *G06F 16/31* (2019.01); *G06F 16/337* (2019.01); *G06F 16/735* (2019.01); *G06F 16/955* (2019.01)

(58) Field of Classification Search
None
See application file for complete search history.

(56) References Cited

U.S. PATENT DOCUMENTS

| | | | | |
|---|---|---|---|---|
| 8,721,340 | B2 * | 5/2014 | LaPasta | G06Q 10/10 434/219 |
| 9,135,568 | B2 * | 9/2015 | Mehta | G06Q 30/0631 |
| 2003/0134261 | A1 * | 7/2003 | Jennen | G09B 7/00 434/354 |
| 2004/0143469 | A1 * | 7/2004 | Lutz | G06Q 10/10 705/321 |

(Continued)

*Primary Examiner* — Mark D Featherstone
*Assistant Examiner* — Navneet Gmahl
(74) *Attorney, Agent, or Firm* — Greenberg Traurig, LLP

(57) ABSTRACT

Systems and methods of the present disclosure enable secure data aggregation in an aggregation database. The aggregation database has an aggregation database schema configured to communicate with entity-specific databases via entity-specific secure connections. The aggregation database receives, from the entity-specific databases, user profiles having an entity identifier identifying an entity, and a metric associated with a user. Groups associated with the user profiles are determined based on the metric associated with each user profile. The user profiles are ranked within each group for a ranking across the entity-specific databases based on the metric. A percentile rank in each group across the entity-specific databases is determined for each user profile. Each user profile is modified to include the percentile rank and are returned to each entity-specific database without other user profiles not associated with each respective entity-specific database.

20 Claims, 18 Drawing Sheets

(56) References Cited

U.S. PATENT DOCUMENTS

| | | | |
|---|---|---|---|
| 2004/0224296 A1* | 11/2004 | Carraccio | G09B 7/00 434/322 |
| 2006/0265237 A1* | 11/2006 | Martin | G06Q 10/10 705/1.1 |
| 2009/0098526 A1* | 4/2009 | Amiri | G09B 19/00 434/247 |
| 2011/0313940 A1* | 12/2011 | Kerr | G06Q 10/1053 705/321 |
| 2012/0023083 A1* | 1/2012 | McCagg | G06Q 10/10 707/706 |
| 2012/0231437 A1* | 9/2012 | Fakhrai | G09B 7/00 434/350 |
| 2013/0244219 A1* | 9/2013 | Roers | G09B 7/00 434/353 |
| 2014/0089219 A1* | 3/2014 | Mathews | G06Q 10/10 705/327 |
| 2014/0222705 A1* | 8/2014 | Aladdin | G06Q 50/20 705/321 |
| 2014/0282098 A1* | 9/2014 | McConnell | G06Q 10/0639 715/753 |
| 2015/0140526 A1* | 5/2015 | Marino | G09B 7/00 434/353 |
| 2016/0055757 A1* | 2/2016 | Santhanam | G09B 5/06 705/326 |
| 2016/0203432 A1* | 7/2016 | Shaw | G06Q 10/06393 705/7.39 |
| 2016/0260044 A1* | 9/2016 | Sabet | G06Q 10/06398 |
| 2016/0343098 A1* | 11/2016 | Patel | G06Q 10/06398 |
| 2016/0379170 A1* | 12/2016 | Pande | G06Q 10/1053 705/321 |
| 2017/0193621 A1* | 7/2017 | Welch | G06Q 10/10 |
| 2017/0330249 A1* | 11/2017 | Celise | G06F 16/9535 |
| 2020/0219218 A1* | 7/2020 | DaCosta-Paul | G06Q 50/2057 |
| 2020/0302296 A1* | 9/2020 | Miller | G06N 20/20 |
| 2020/0356955 A1* | 11/2020 | Graziano | G06Q 10/1053 |
| 2021/0081900 A1* | 3/2021 | Wang | G06N 5/04 |
| 2021/0110496 A1* | 4/2021 | Kmiec | G06F 16/2315 |
| 2022/0028020 A1* | 1/2022 | Wray | G06Q 50/2057 |
| 2022/0092028 A1* | 3/2022 | Layton | G06F 16/164 |
| 2022/0292423 A1* | 9/2022 | Ash | G06Q 30/01 |

* cited by examiner

SYSTEMS AND METHODS FOR SECURED DATA AGGREGATION VIA AN AGGREGATION DATABASE SCHEMA

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, SkillSurvey, Inc., All Rights Reserved.

FIELD OF TECHNOLOGY

The present disclosure generally relates to computer-based systems utilizing database architectures configured for norming and generating indicia predicting characteristics of electronic profiles of people, for example a student of an educational institution.

BACKGROUND OF TECHNOLOGY

A computer network system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

Institutions often rely on observations collected via student self-reports, which may differ (e.g., less reliable and less valid) from those who have worked with the student, and, have not been demonstrated to correlate with success in the workplace. Without consistent, standardized improvements in the collection and analysis of evaluation information, institutions are unable to collect and interpret reliable and valid data that could help provide actionable insights on how students may improve their work-related competence and thus be better prepared to successfully enter the workforce.

SUMMARY OF THE DISCLOSURE

In some embodiments, the exemplary computer-implemented method may include at least the following steps of: generating, by at least one processor, a student profile in an educational institution database for each student of a plurality of students associated with an educational institution; where each student profile includes: i) an employment position field identifying an employment position, ii) a career readiness (CR) survey field for storing a CR survey identifier identifying a CR survey, iii) a norm group field for storing a norm group identifier identifying a norm group, and iv) a numeric rating field for storing a numeric rating data entry representing a numeric rating; determining, by at least one processor, the CR survey identifier and the norm group identifier for each student profile based on the CR survey and the norm group associated with the employment position field; transmitting, by at least one processor, the CR survey associated with each CR survey identifier of each student profile to at least one evaluator for each student; where the CR survey includes a plurality of data fields associated with a plurality of behavioral item questions for receiving a rating data entry in each data field of the plurality of data fields for each behavioral item question of the plurality of behavioral item questions; receiving, by at least one processor, a rating for each behavioral item question of the plurality of behavioral item questions in the CR survey from the rating data entry in each data field of the plurality of data fields by the at least one evaluator of each student; generating, by at least one processor, a numeric rating associated with each student profile based on an aggregation of the rating for each behavioral item question in the CR survey from each evaluator; transmitting, by at least one processor, each student profile to a student assessment database, each student profile including the employment position associated with each student profile and the numeric rating associated with each student profile; where the student assessment database is configured to aggregate the student profile of each student of the plurality of students with additional student profiles from a plurality of an educational institutions into respective norm groups and determine a percentile rank of each student profile and each additional student profile within each respective norm group according to each numeric rating of each student profile and each additional student profile; receiving, by at least one processor, at the educational institution database the percentile rank of each student profile of each student associated with the educational institution from the student assessment database; determining, by at least one processor, a response rate for each student profile based on a number of responding evaluators of the at least one evaluator; generating, by at least one processor, a personalized career readiness index for each student profile based on the response rate, the percentile rank and the numeric rating associated with each student profile to measure a career-specific metric of career readiness; causing to display, by at least one processor, the career readiness index of one or more student profiles associated with one or more students of the plurality of students to a user on a web-based dashboard; and causing to display, by at least one processor, a performance indicator for the educational institution indicative of the relative performance of the educational institution relative to the plurality of educational institutions based on the career readiness index of the plurality of students.

In some embodiments, the exemplary computer-implemented method may include at least the following steps of: receiving, by at least one processor associated with a student assessment database, each student profile of a plurality of student profiles from a plurality of educational institution databases; where each student profile includes: i) an employment position field storing an employment position identifier identifying an employment position, ii) a CR survey field storing a CR survey identifier identifying a CR survey associated with the employment position identifier, iii) a norm group field storing a norm group identifier identifying a norm group associated with the employment position identifier, and iv) a numeric rating field storing a numeric rating data entry representing a numeric rating; where the CR survey includes a plurality of data fields associated with a plurality of behavioral item questions for receiving a rating data entry in each data field of the plurality of data fields for each behavioral item question of the plurality of behavioral item questions; where a rating for each behavioral item question of the plurality of behavioral item questions in the CR survey includes the rating data entry in each data field of the plurality of data fields by the at least one evaluator of each student; where the numeric rating associated with each student profile includes an aggregation of the rating for each behavioral item question in the CR survey from each evaluator; determining, by the at least one processor, a percentile rank of each student profile from each educational institution database of the plurality of educational institution databases within each respective norm group according to each numeric rating of each student profile; transmitting, by at least one processor, the percentile rank of each respective student profile to a respective educational institution database of the plurality of educational institution databases associated with each respective student profile.

In some embodiments, the exemplary computer-based system may include at least the following component of: an educational institution database storing a student profile for each student of a plurality of students associated with an educational institution; at least one processor configured to implement software instructions causing the at least one processor to perform steps to: generate the student profile for each student of the plurality of students associated with the educational institution; where each student profile includes: i) an employment position field identifying an employment position, ii) a CR survey field for storing a CR survey identifier identifying a CR survey, iii) a norm group field for storing a norm group identifier identifying a norm group, and iv) a numeric rating field for storing a numeric rating data entry representing a numeric rating; determine the CR survey identifier and the norm group identifier for each student profile based on the CR survey and the norm group associated with the employment position field; transmit the CR survey associated with each CR survey identifier of each student profile to at least one evaluator for each student; where the CR survey includes a plurality of data fields associated with a plurality of behavioral item questions for receiving a rating data entry in each data field of the plurality of data fields for each behavioral item question of the plurality of behavioral item questions; receive a rating for each behavioral item question of the plurality of behavioral item questions in the CR survey from the rating data entry in each data field of the plurality of data fields by the at least one evaluator of each student; generate a numeric rating associated with each student profile based on an aggregation of the rating for each behavioral item question in the CR survey from each evaluator; transmit each student profile to a student assessment database, each student profile including the employment position associated with each student profile and the numeric rating associated with each student profile; where the student assessment database is configured to aggregate the student profile of each student of the plurality of students with additional student profiles from a plurality of universities into respective norm groups and determine a percentile rank of each student profile and each additional student profile within each respective norm group according to each numeric rating of each student profile and each additional student profile; receive at the educational institution database the percentile rank of each student profile of each student associated with the educational institution from the student assessment database; determine a response rate for each student profile based on a number of responding evaluators of the at least one evaluator; generate a personalized career readiness index for each student profile based on the response rate, the percentile rank and the numeric rating associated with each student profile to measure a career-specific metric of career readiness; cause to display the career readiness index of one or more student profiles associated with one or more students of the plurality of students to a user on a web-based dashboard; and cause to display a performance indicator for the educational institution indicative of the relative performance of the educational institution relative to the plurality of educational institutions based on the career readiness index of the plurality of students.

In some embodiments, each behavioral item question includes one or more career specific behavioral item question variations from a library of behavioral item questions.

In some embodiments, each behavioral item question includes: one or more behavioral item questions determined from the library of behavioral item questions for each core competency categorization of a set of core competency categorizations associated with each CR survey; and the one or more career specific behavioral item question variations generated from each respective one or more behavioral item questions associated with each CR survey.

In some embodiments, one or more career specific behavioral item question variations are determined from a library of behavioral item questions; and the CR survey is generated from the one or more career-specific behavioral item question variations.

In some embodiments, a set of core competency categorizations associated with each CR survey is determined; one or more behavioral item questions from the library of behavioral item questions for each core competency categorization of the set of core competency categorizations associated with each CR survey are determined; and the one or more career specific behavioral item question variations for each respective one or more behavioral item questions associated with each CR survey.

In some embodiments, an average rating for each CR survey for each student based at least in part on an average of each rating in each CR survey for each evaluator of the at least one evaluator may be determined; and an average numeric rating based on an average of the average rating across each CR survey may be determined.

In some embodiments, the student assessment database may include a plurality of databases, each of the plurality of databases corresponding to a respective norm group.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
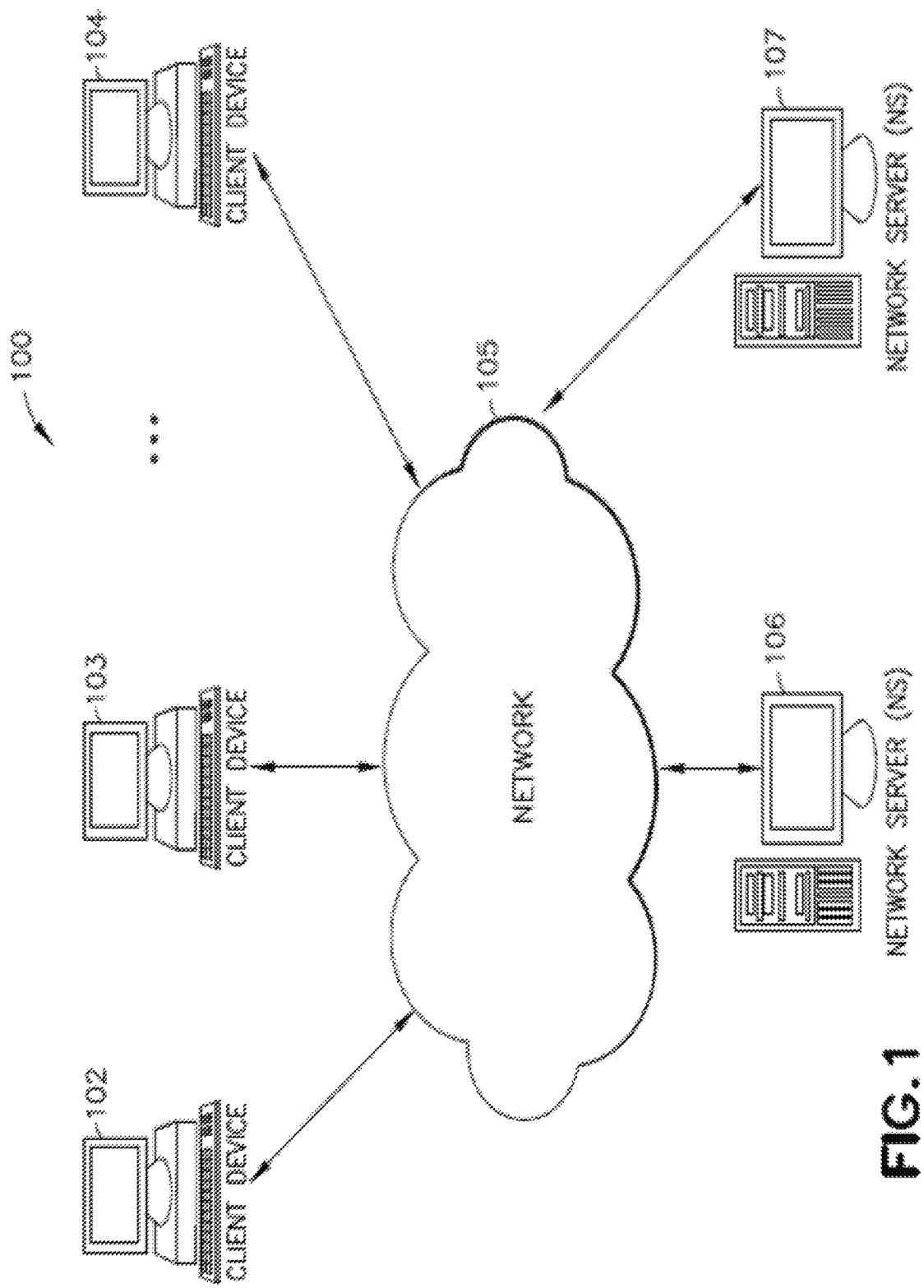
FIGS. 1-18 show one or more schematic flow diagrams, certain computer-based architectures, and/or screenshots of various specialized graphical user interfaces which are illustrative of some exemplary aspects of at least some embodiments of the present disclosure.

FIG. 1 depicts a block diagram of an exemplary computer-based system 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., user devices) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, hiring-related services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
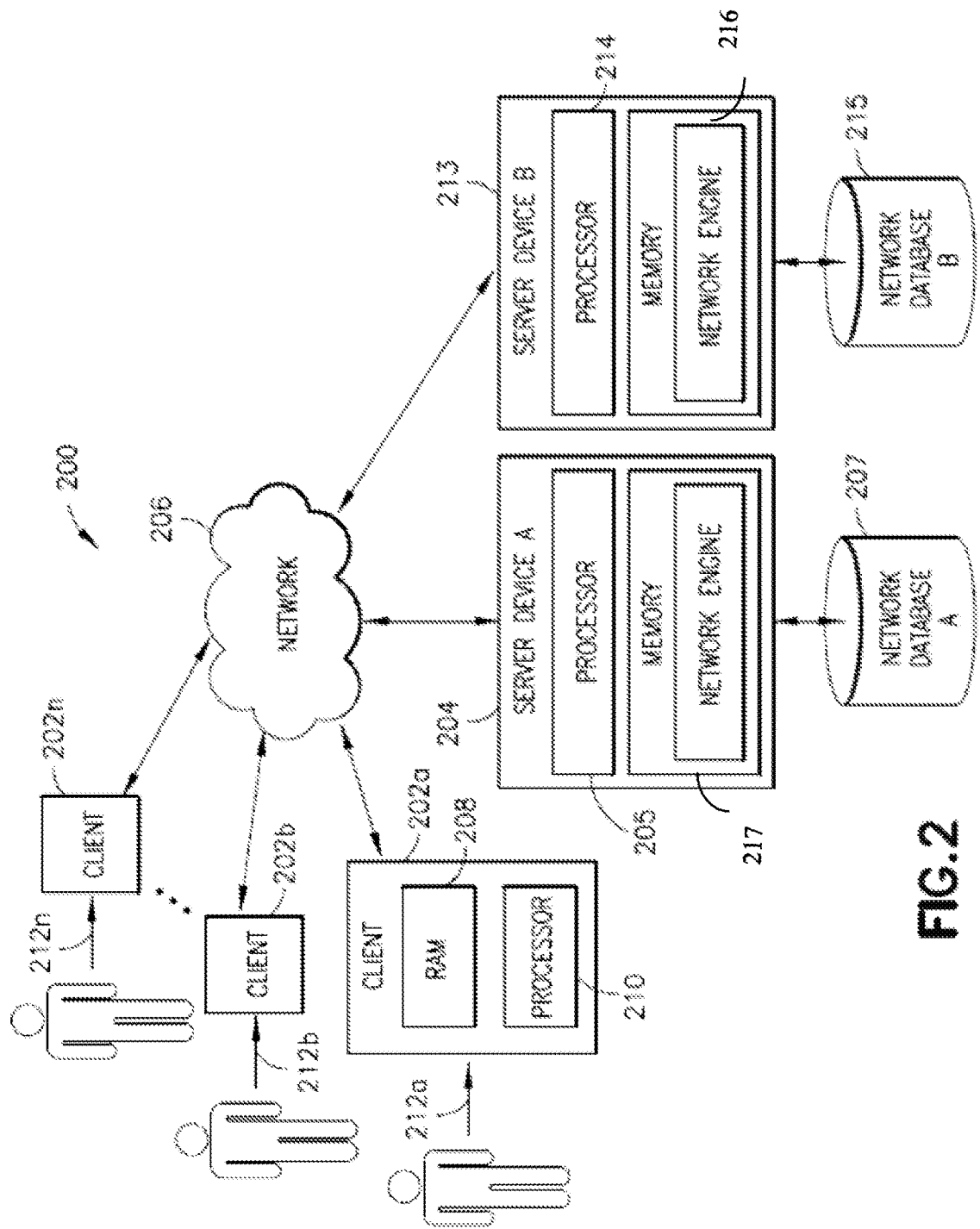

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of user device 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor may read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a through 202n (e.g., user devices) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through 202n may be specifically programmed with one or more application programs in accordance with one or more principles/methodologies detailed herein. In some embodiments, member computing devices 202a through 202n may operate on any operating system capable of supporting a browser or browser-enabled application, such as Microsoft™ Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing user device devices 202a through 202n, users, 212a through 212n, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202a through 202n may be mobile user devices.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
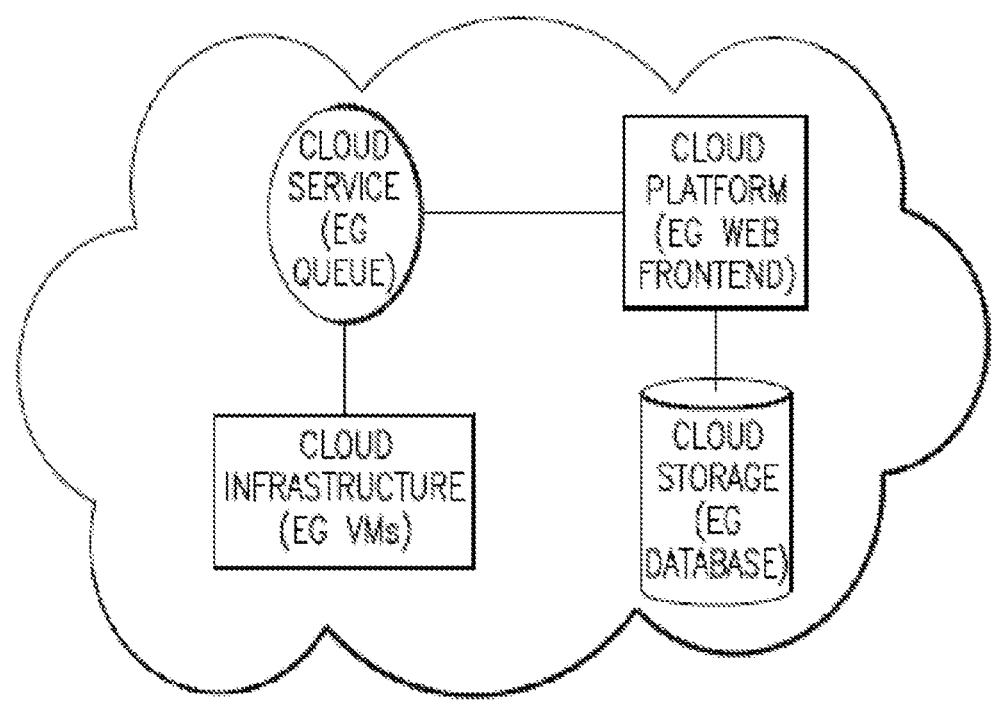
Figure 4:
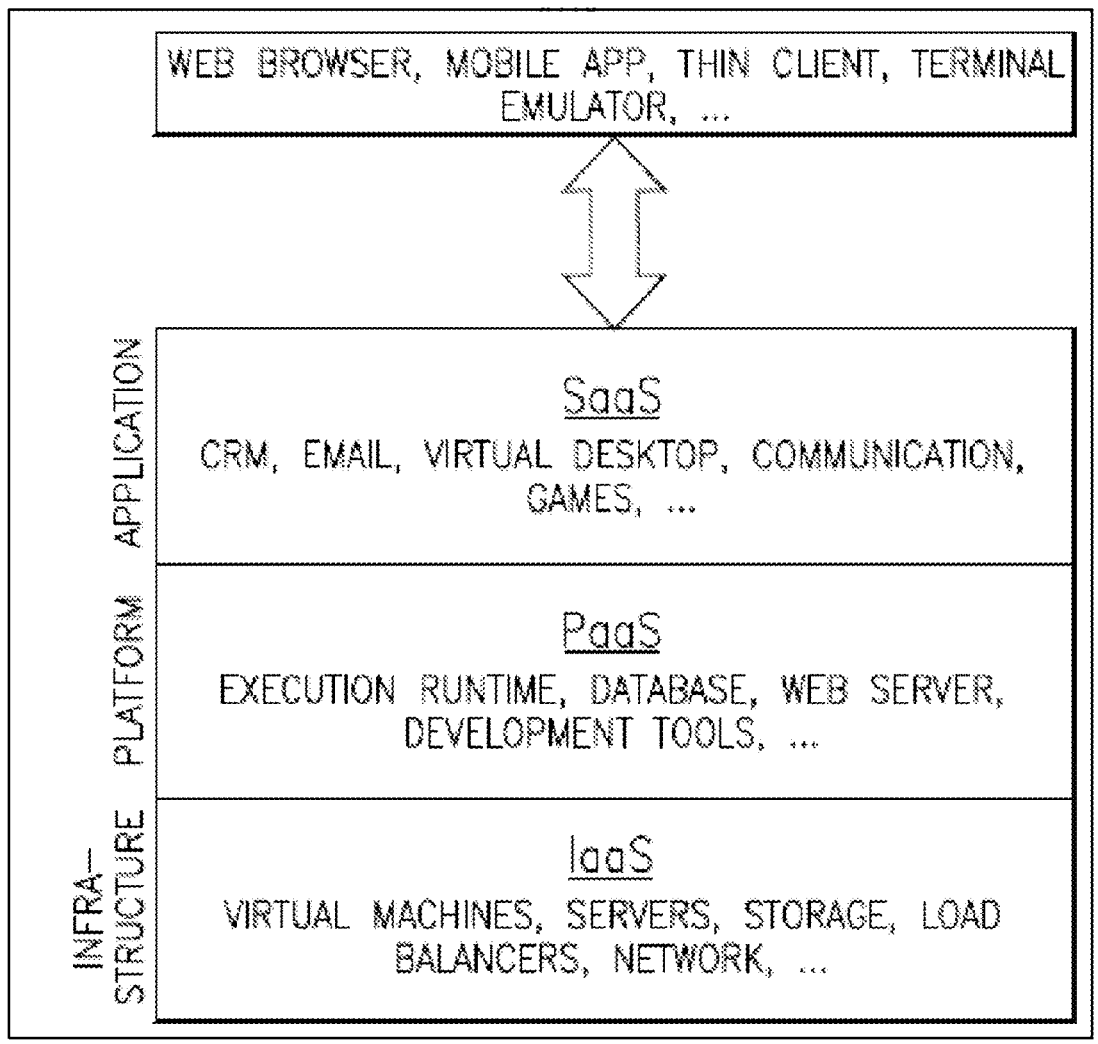

In some embodiments, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS), platform as a service (PaaS), and/or software as a service (SaaS). FIGS. 3 and 4 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

FIGS. 5 through 18 illustrate systems and methods of web servers, databases and processing systems for a student evaluation system with automated analysis of quantitative surveys to determine student career readiness and/or an organization's (e.g., college, university, vocational school, and the like) performance in readying students for careers while maintaining confidentiality of the underlying data. For example, the following illustrative embodiments provide technical solutions and/or technical improvements that overcome technical problems, drawbacks and/or deficiencies in the technical fields involving privacy risks resulting from systems for student evaluations and organization performance in readying students that would ordinarily result in disclosing and/or allowing to identify the performance of other students and/or organizations. There exists is a technological problem where a first entity comparing data with data from another entity results in direct sharing of potentially private information between the two entities. Moreover, each entity that the first entity would evaluate data against would have to have a separate connection with the first entity, resulting in high bandwidth and resource requirements. As explained in more detail, below, technical solutions and/or technical improvements herein include aspects of improved analysis by the exemplary student evaluation system for determining career readiness using database permissioning to produce meaningful and actionable quantitative indicators of performance while solving the technical problems above regarding data privacy and resource usage associated with evaluating data with multiple other entities. Embodiments of the present disclosure provides technical solutions including a centralized, dedicated evaluation database for performing the data evaluation amongst all participating entities without sharing the data from one entity to another entity, thus providing a technical solution to data privacy issues. Thus, each entity may maintain control of its own data and the privacy of this data, while still being able to evaluate the data with that of other entities. Based on such technical features, further technical benefits become available to users and operators of these systems and methods. Moreover, various practical applications of the disclosed technology are also described, which provide further practical benefits to users and operators that are also new and useful improvements in the art.

Figure 5:
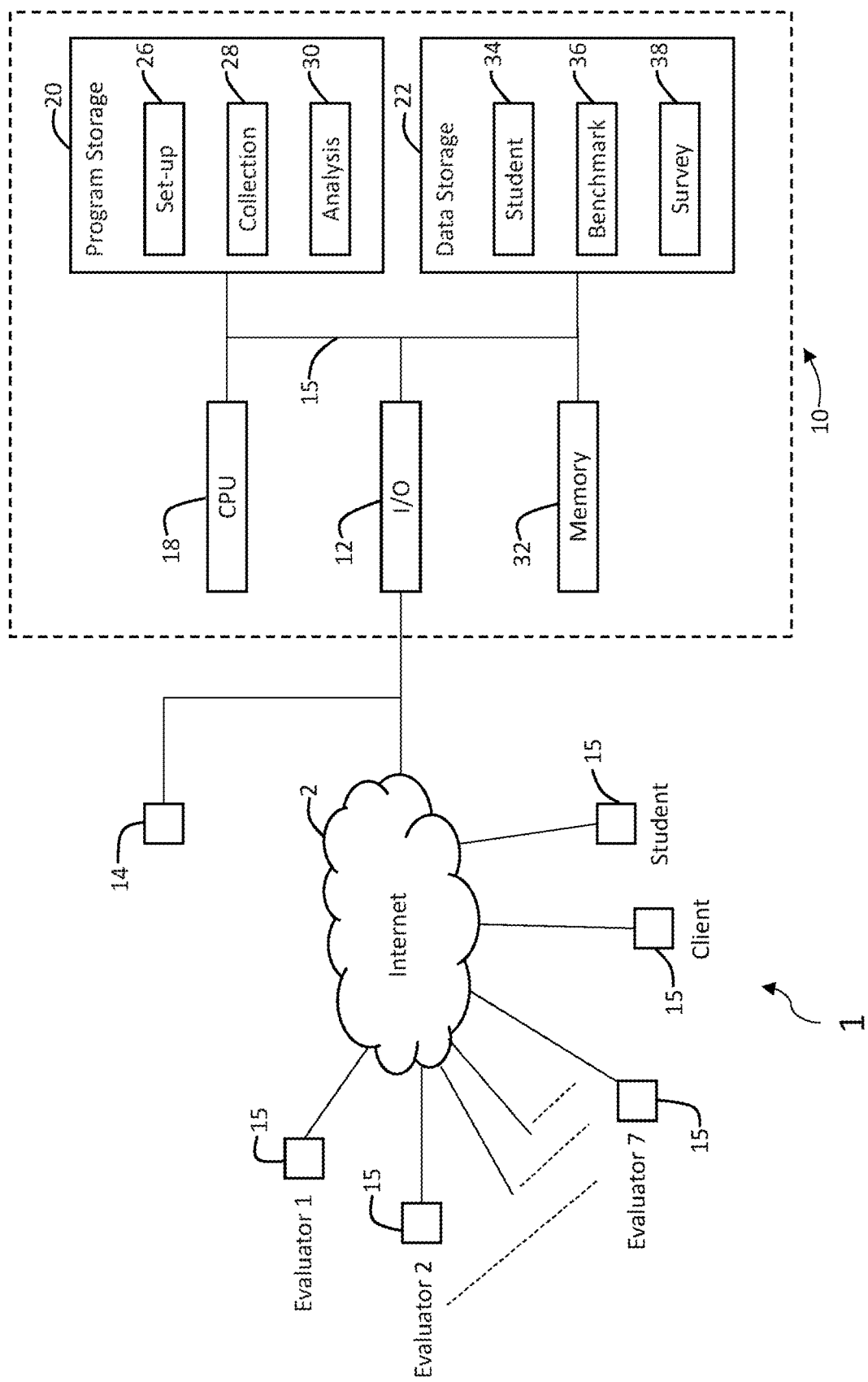

FIG. 5 is a block diagram of another exemplary computer-based system/platform for an inventive student evaluation system in accordance with one or more embodiments of the present disclosure.

In some embodiments, the exemplary inventive student evaluation system 1 of the present disclosure may involve a number of computers 10 and 15 that are connected to each other through a computer network such as the Internet. The computers 10 and 15 of the exemplary inventive student evaluation system 1 cooperate with each other to provide comprehensive collection and analysis of evaluator information that are made through the network 2. Computers 15 are similar to the student evaluation system 10, with the exception of some of the databases and software modules.

As illustrated in FIG. 5, the exemplary student evaluation system 10 may be connected to the Internet 2 through, for example, an I/O interface 12, such as for a LAN, WAN, or fiber optic, wireless or cable link, which receives information from and sends information to other computers 15. The student evaluation system 10 is also connected to a keyboard 14 for controlling the computer.

In some embodiments, the exemplary inventive student evaluation system 10 may include, for example, memory storage 16, processor (CPU) 18, program storage 20, and data storage 22, all commonly connected to each other through a bus 24. The program storage 20 stores, among others, software programs such as set-up module 26, collection module 28, and analysis module 30 as will be explained in detail later herein. The data storage 22 stores, among others, student database 34, benchmark database 36, survey database 38 and norming database 40, all may be stored in a relational database that relates all of the databases stored in the data storage. Any of the software program modules in the program storage 20 and data from the data storage 22 may be transferred to the memory 32 as needed and is executed by the processor 18.

In some embodiments, the student database 34 may store electronic student profiles for each student associated with a particular university. In an embodiment, a student profile can include data indicative of various aspects of career readiness. In particular, the student profile may include fields for one or more employment positions, career readiness (CR) survey identifiers for identifying the CR survey applicable to the employment positions, numeric ratings data for storing feedback and ratings provided by evaluators in response to the CR surveys, a norm group identification for which subset of a population the student belongs, among other related information determined for a given student.

In some embodiments, the CR survey identifier in the CR survey field can link to particular surveys or survey questions that have been determined for a particular student. For example, the survey database 38 may maintain an electronic library of questions, such as career-specific questions, general questions, career-specific variations or the general questions, question sets for a particular survey or group of surveys, amongst other formats for storing survey data. The CR survey identifier may identify specific surveys, specific questions or groups of questions, or combinations thereof. Thus, the CR surveys may be maintained in electronic form in the survey database 38.

The student evaluation system 10 may be any computer such as a WINDOWS-based or UNIX-based personal computer, server, workstation or a mainframe, or a combination thereof. While the student evaluation system 10 is illustrated as a single computer unit for purposes of clarity, persons of ordinary skill in the art will appreciate that the system may comprise a group of computers which may be scaled depending on the processing load and database size and which may be remotely located to provide localized non-stop service.

Figure 6:
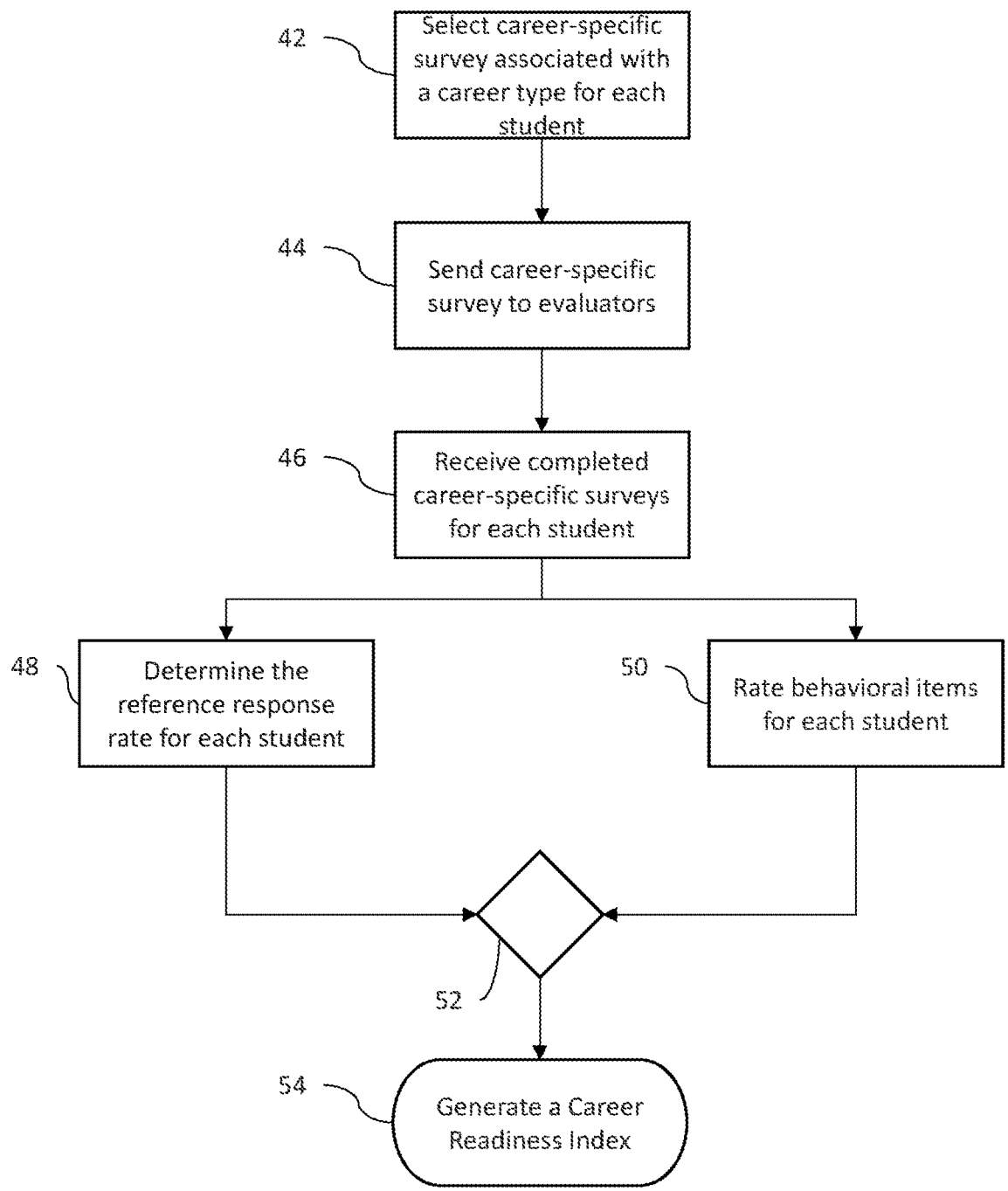

FIG. 6 illustrates a flowchart of an exemplary inventive methodology in accordance with one or more embodiments of the present disclosure.

In an embodiment, a career readiness index is generated for each student at a participating university based on the CR surveys rating each student. In some embodiments, the CR surveys and ratings for each student may be maintained in a respective student profile. In an embodiment, the career readiness information includes a career type or career field and a numeric score relative to that career type or career field based on feedback from evaluators. To effectuate the generation of the career readiness index on the student evaluation platform, each student may have an electronic student profile for storing career-related data. For example, a student profile can include fields for the career type or career field, a particular position within that career, survey results including ratings provided by evaluators in response to surveys specific to the career field or career type, an aggregation of the ratings forming a numeric rating, among other data related to indicating career readiness.

Accordingly, in an embodiment, the student profile data object(s) of a particular student can include data obtained from a self-rating/self-assessment. In conjunction with any embodiment below, in some embodiments, the student evaluation system 10 can be programmed, along with evaluator feedback, enable institutions the opportunity to allow their students to also take a behavior-based self-rating/self-assessment survey(s). For example, in one embodiment, the student evaluation system 10 can be programmed to present students, via provided graphical user survey interface(s) shown at computing devices of students questions that can be the same or similar to questions generated for evaluators but are asked to provide their opinion on how they would rate themselves on each behavior based on the same or similar extent scale.

For example, in one embodiment, the student evaluation system 10 can be programmed, via programmed graphical user interface(s) to enable students to enter evaluators and present the student with an additional step to complete a self-assessment survey. For example, in one embodiment, the student evaluation system 10 can be programmed to allow the student to start the self-assessment only after at least one evaluator's data has been submitted or only after at least one evaluator submitted his/her rating. For example, in one embodiment, the student evaluation system 10 can be programmed to automatically select/generate the self-assessment survey based at least in part on the survey chosen for evaluators. For example, in one embodiment, the student evaluation system 10 can be programmed to generate/select the behavioral questions for the self-assessment survey that may be similar to those presented to the evaluators with the only exception being that each question is designed for students to provide feedback on themselves within the self-assessment. For example, in one embodiment, the self-assessment survey may be displayed in the same format as the evaluator survey that is transmitted, over a computer network, to computer devices of the evaluators and may include the same or similar questions as the evaluator survey generated/selected.

For example, in one embodiment, the self-assessment survey may be ranked at, without limitation, at 7-point extent scale with selection options, ranging from Never (1) to Always (7) to allow students to provide their opinions the degree to which they exhibit each individually listed behavior. For example, "Not Observed" option may be programmed to be available to the student to select for each behavior as well. For example, in one embodiment, the self-assessment survey may be configured to generate/select verbatim strength and areas of improvement questions that may be the same or similar to those presented to evaluators. For example, in one embodiment, the self-assessment survey may be configured to generate/select customized questions (e.g., institution-specific, student-specific, or both) when, for example without limitation, the institution selects the option to ask these questions during the self-assessment.

For example, in one embodiment, the student evaluation system 10 can be programmed to enable a toggle option to show or hide self-assessment results as part of or in addition to the output of career-readiness report (e.g., within the same interface, within same output) that is detailed herein. For example, in one embodiment, the student evaluation system 10 can be programmed to display self-assessment results in the following, or similarly suitable, format without limitation. For example, at the overall level, at each competency cluster level, and for each behavior, an additional bar may be generated below the Evaluator(s) bar to display the Self-Assessment results. For example, each bar may present the student's rating (for example, based on the 1-7 extent scale) that have been determined by the responses provided by the student for each behavior question on the self-assessment. For example, the behavior-level results may reflect self-assessment result provided by student. For example, the cluster-level results reflect average of ratings provided by the student for each question in the given cluster. For example, the overall-level result may reflect average of all ratings provided by the student.

For example, in one embodiment, the student evaluation system 10 can be programmed to generate Self-Assessment bars to appear, within the output (e.g., computer interfaces), directly below corresponding Evaluator(s) bar so that the viewer of the output (CR report) can easily see how students perceive themselves for given behaviors vs. how evaluators perceive the student against those same behaviors. For example, in one embodiment, the student evaluation system 10 can be programmed to generate Self-Assessment bars to appear to show overall self-assessment of students of one institution vs. overall overall self-assessment of students of one institutionoverall self-assessment of students of one institutionoverall self-assessment of students of one institutionoverall self-assessment of students of one institutionoverall self-assessment of students of one institution(s).

Accordingly, in an embodiment, the student evaluation system 10 may receive the CR surveys from evaluators including the individual question ratings. The student evaluation system 10 may use the question ratings of each CR survey to determine the numeric rating of each CR survey for each student, which may in turn be stored within the respective student profiles. In an embodiment, a CR survey may be an electronic survey formed of a set of data field for receiving data entries from the evaluators on devices associated with the evaluators. For example, an evaluator may view a survey in a webpage and enter, e.g., numeric or qualitative ratings, in the data fields in response to associated questions.

In an embodiment, a survey is selected that is associated with a career field in block 42. For example, 20 career-specific CR surveys may be available within the student evaluation platform, e.g., stored in the data storage 22 in survey 38 in a student evaluation computing system of, e.g., FIG. 5 above, however other numbers of CR surveys may be employed, such as, e.g., 10, 15, 18, or greater than 20. In an embodiment, these surveys reflect the most frequent internships or work experiences offered by educational institutions, businesses, or both. Examples of such work experiences include, but are not limited to: Arts & Design, Business, Clinical, Computer Science, Culinary Arts, Data Science/Mathematics, Economics, Engineering, English & Literature, Finance, General, Hotel Operations, Human Resources, Lab Sciences, Marketing/Communications, Political Science, Research, Social Services, Teaching/Education, U.S. Armed Forces and other possible types of work experiences. Herein, work experiences can include, e.g., paid or unpaid internships or co-ops, work study programs, community services, among any other paid or unpaid work.

In an embodiment, the survey is selected at block 42 from a library of career-specific career readiness surveys by, e.g., a processing device such as the CPU 18 of a student evaluation computing system 10 of, e.g., FIG. 5 above, running commands stored in the program storage 20. In an embodiment, each CR survey includes behavioral items tailored to the selected internship/career type to measure career readiness of a student. In an embodiment, the CR surveys measure career readiness using a combination of behavioral items, such as, e.g., 27 to 30 behavioral items. In an embodiment, each behavioral item is created to measure one of the 8 National Association of Colleges and Employers (NACE) competencies. In an embodiment, the 8 competencies may include: Professionalism/Work Ethic, Oral/Written Communications, Digital Technology, Teamwork/Collaboration, Critical Thinking/Problem Solving, Career Management, Leadership, Global/Intercultural Fluency, or other suitable competencies for evaluating career readiness.

In an embodiment, the behavioral items have been validated against work outcomes by using pre- and post-hire data from entry-level job candidates that have subsequently been hired. In an embodiment, professional/work evaluators are entered into the system by the student, by a career administrator, guidance counselor, or other suitable party for entering evaluators into the system.

In an embodiment, open-ended comments provided by the Evaluators as to a student's strengths or areas for improvement at work are presented on the student's report, as is (e.g., verbatim). In some embodiments, the open-ended comments may be used as an area for evaluation of career readiness, based upon the results of a study of text analytic research on feedback from N=20,000 Evaluators across 5,000 job candidates applying for one of 25 representative jobs. Such study revealed that 88.9% of the evaluators provide verbatim comments as to a job candidate's work-related strengths; 82.2% provide verbatim comments as to a job candidate's work-related areas for improvement. Top strengths and areas for improvement, across all 25 jobs, and within each individual job, may be found in our recent published article (Hedricks, et al., "Content of qualitative feedback provided by job references during structured, confidential reference checks," Personnel Assessment and Decisions, 2018). Thus, the verbatim data may provide useful information in assessing career readiness.

Moreover, in an embodiment, the behavioral items are selected to tailor the CR surveys according to work requirements posed by education institutions, business, or both. In an embodiment, the CR survey including the selected behavioral items may be sent to evaluators for them to provide feedback on the students, at block 44 by, e.g., a collection program 28 in a program storage 20 and run by a CPU 18 of an exemplary student evaluation computing system of, e.g., FIG. 5 above. Evaluators may rate the students using a scale which represents the extent to which a student has demonstrated a given behavior during their work experiences, compared to other interns the evaluator has observed. In an embodiment, the items start out with: "To what extent does <student's name> . . . ". However, other question formats suitable for attaching a numeric scale are contemplated. In an embodiment, the scale ranges from a 1 to a 7; however, other ranges are contemplated, such as from 0 to 1, from 1-5, from 0-7, from 0 to 10, from 1-10, from 0 to 20, from 0 to 100, or any other suitable range of numbers.

In some embodiment, the CR survey presented to evaluators depicting numerical rating options or include descriptive rating options, e.g., often, sometimes, never, etc. for each question. Where descriptive rating options are shown, the student evaluation system 10 may determine a corresponding value for each descriptive option to convert descriptive response selections to numerical values along the numeric scale.

In an embodiment, the evaluator indicates a rating for each behavioral item, except for behavioral items for which the evaluator has insufficient knowledge. As an example, the 1 to 7 scale is used, where a "1" indicates that the student intern never demonstrated a given behavior and a "7" indicates that the student intern always demonstrated a given behavior, and where the evaluator has insufficient knowledge of the behavior of the student with respect to the given behavior, a "Not Observed" (N/O) option may be selectable. For example, the evaluator is also instructed as follows: "If you cannot answer a particular question based on your own personal experience or observation of the student, click the "Not Observed" (N/O) button for that question."

However, the CR surveys may take another numeric rating format other than a scale from 1 to 7 or using the "N/O" option. Rather, any suitable numeric rating system with a response option that indicates insufficient knowledge on the part of the Evaluator may be used. For example, a "Not Applicable (N/A)" option may be selectable, or a "null" may be used for the insufficient knowledge response. Other suitable rating formats for use with a numeric extent scale are also contemplated by embodiments of the present disclosure.

In some embodiments, the student evaluation system 10 may receive or otherwise collect evaluator responses to the exemplary CR surveys of the present disclosure from each evaluator to whom a CR survey has been delivered, at block 46. For example, evaluators 15 may send, via the internet 2 as described with reference to FIG. 5 above, survey responses to the student evaluation system 10 to be collected in data storage 22 as a survey data 38. Greater numbers of evaluator responses may facilitate improved certainty of students' numeric ratings for each behavioral item in each respective exemplary CR survey for the work experience just completed by the student. In an embodiment, a minimum of one completed CR survey is required in order to generate a report on a student. However, other numbers of surveys may be required to generate the report.

In an embodiment, once at least one evaluator has completed a survey for a given student, the student evaluation system 10 compiles the numeric behavioral ratings to generate a numeric rating for the student, at block 50. For example, all of the behavioral items in the surveys are averaged to create the student's Average Numeric Rating. However, other rating methods are contemplated.

For example, studies of over 50,000 new hires in the workforce have revealed that the Average Numeric Rating, derived from Evaluator ratings, and the percent of Evaluators who comply with the request made by the individuals when they were job candidates, are at least two statistically significant, independent predictors of work outcomes of new hires (e.g., first year turnover for cause).

Therefore, in some embodiments, at block 48, the student evaluation system 10 determines a reference response rate (RRR) for each student. In an embodiment, the RRR is a number of Evaluators who responded divided by the number of Evaluators contacted to fill out a specific career readiness (CR) survey at block 44. The predictive ability of the percent of Evaluators complying with the job candidate request has only been statistically tested on these individuals. Such individuals receive, on average, specific career readiness survey ratings from at least 3 to 5 Evaluators (average of 4.4 Evaluators). Reports generated on students reveal that 82.6 (%) percent of all students achieve a Reference Response Rate of 100 percent (i.e., 1 requested/1 received; 2 requested/2 received; 2019/2020 student data). The psychometric integrity—reliability (inter-rater; internal consistency; and intra-rater), predictive validity, and compliance with EEOC guidelines—of Overall Average Numeric Ratings calculated on a large distribution of job candidates has been published in a peer-reviewed scientific journal (Hedricks, et al., "Web-Based Multisource Reference Checking: An Investigation of Psychometric Integrity and Applied Benefits," *International Journal of Assessment and Selection*, 2013).

The RRR and the Average Numeric Score from the behavioral items are combined at block 52 to determine student career readiness in the form of a personalized Career Readiness Index (CRI). The combination of the RRR and the Average Numeric Score may include, e.g., a suitable statistical analysis for representing the student's performance relative to other students seeking a particular position, including other students in a norm group without direct reference to any student's personally identifiable information, as is further described below. The analysis may include, e.g., a cumulative analysis, norming of the data (e.g., ratings, difference scores, response metrics), percentile of the student's Evaluator ratings compared to that of other students, percentile of the student's Evaluator ratings compared to those of job candidates, percentiles associated with the student's self-rating, percentiles associated with Evaluator vs. student difference scores, percentiles associated with career outcome measures, ranking, weighted averages (from both Evaluator and self) according to each of the NACE competencies, or other analyses and combinations thereof.

As a result of the combining, a career readiness index is generated at block 54. In an embodiment, the career readiness index is a numerical representation of the student's career-specific competency level. Thus, an end user, such as, e.g., the student, the educational institution, or other end user, may easily determine readiness for a career using the career readiness index. Moreover, a hiring entity may also easily determine the degree to which a given student is ready for the position to which the student has applied, thus informing the hiring entity with actionable data for making hiring decisions. In an embodiment, a student's career readiness index may be provided to the student's educators via, e.g., a school database. The student's career readiness index, as well as the aggregate of students' career readiness indices in the school database may be used to assess the school's performance in readying students for a career. The career readiness indices in the school database may be kept confidential to the school for internal assessment or improvement.

Figure 7:
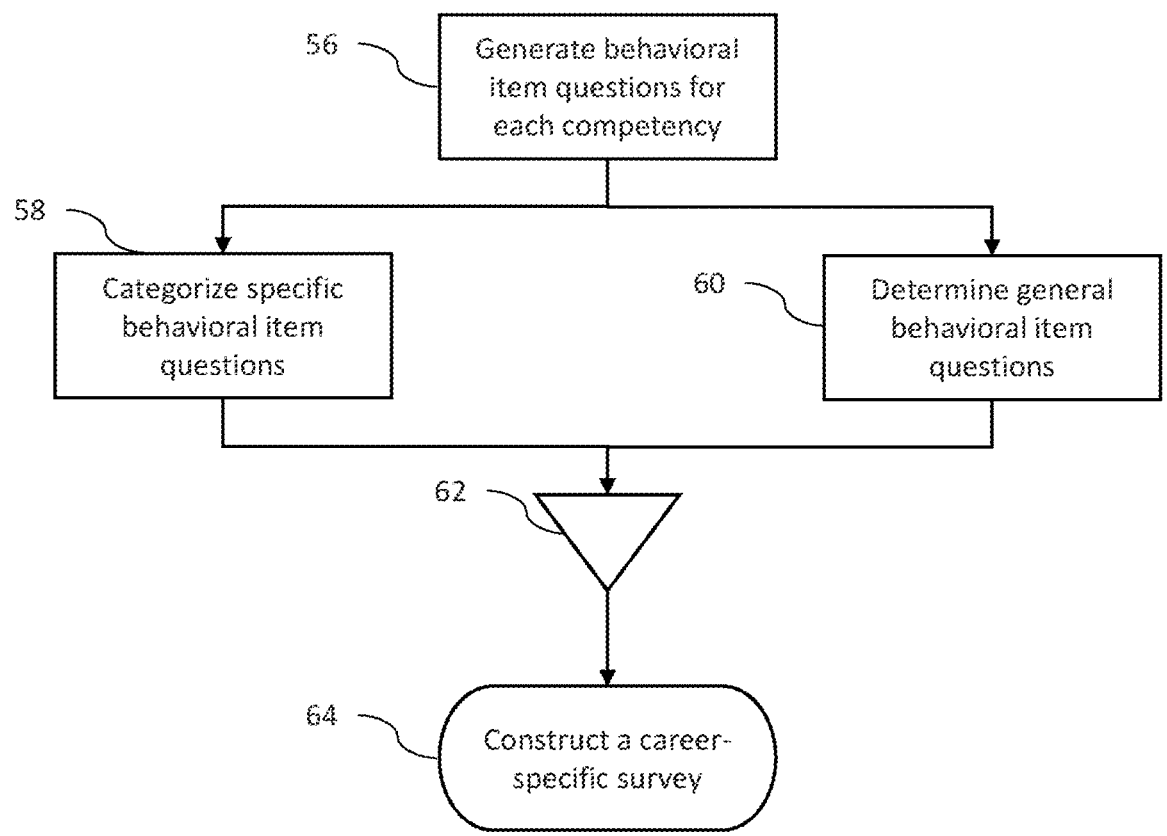

FIG. 7 illustrates a flowchart of an exemplary inventive methodology in accordance with one or more embodiments of the present disclosure.

In some embodiments, when a student expresses interest in a particular employment position, such as, e.g., an internship or full-time position, a particular field or other subset of positions, the student evaluation system 10 may automatically select a CR survey to be sent to evaluators may be selected that includes questions pertaining to behavioral items, as described above. In an embodiment, in response to a selection of a career and/or position for a given student, the student evaluation system 10 may identify behavioral item questions from each competency in relevant to the career, at block 56. In an embodiment, the questions may be presented electronically, with each question accompanied by a data entry field associated with the respective question. In some embodiments, the data entry fields may be a text box for receiving numerical or alphabetical text entry. In an embodiment, the data entry fields may be radio buttons, or other type of electronic selection mechanism to select one or more options from multiple choices. Each data entry field is configured to accept electronic input by the Evaluator responding to the survey. Accordingly, the surveys and responses to the surveys are entirely electronic. For example, various CR surveys may be digitally mapped via one or more data structures to a particular internship and/or other work experience (e.g., Business, Data Science, Hotel Operations, US Armed Forces). For example, an institution could choose to have the student evaluated on the Data Science survey if the student had just completed a data science internship/work experience. Or if they completed a work experience in hotel operations, the institution could choose to have the student evaluated on the Hotel Operations survey.

In an embodiment of the present disclosure, the majority of behavioral items are included in all CR surveys, of which there may be any number (e.g., without limitation, 10-20, 10-50, 10-100, and other suitable number), depending on a number of position types and/or competencies. For example, general questions may be related to a degree to which a student has demonstrated behavioral items including: demonstrated dependability as related to professionalism and work ethic (e.g., report consistently, and on time, for work or meetings), listening carefully to others, taking time to understand and ask appropriate questions without interrupting as related to teamwork and collaboration, making decisions and solving problems using sound reasoning and judgment as well as multi-tasking well in a fast-paced environment as related to critical thinking and problem solving, showing an awareness of own strengths and areas for development as related to career management, serving as a role model to others by approaching tasks with confidence and a positive attitude as related to leadership, among other possible behaviors that pertain to all employment positions. Each CR survey may include a predetermined set including some or all of these general behavior item questions. Thus, the CR surveys may be predefined in a library such that the student evaluation system 10 may select a CR survey having a fixed set of questions therein. However, in some embodiments, the student evaluation system 10 may automatically select one or more general behavioral item questions from a library of general behavioral item questions, at block 60, to dynamically create set of general behavioral item questions in the CR survey. For example, a particular CR survey may be a combination of (1) pre-determined questions directed to static behaviors (e.g., Hotel Operations survey) and (2) customized question(s) determined/selected by the institution. In some embodiments, the customized question(s) may be presented on the graphical user interface in the form of open-ended text boxes, numeric rating scales, single- or multiple-select options, and other similarly suitable elements.

In an embodiment, some behavioral items may be specific to a position. These specific behavioral items may be categorized according to the positions and automatically selected by the student evaluation system 10, at block 58 when forming a particular CR survey. For example, there may be approximately 3 or 4 behavioral items in each CR survey that have been modified (or adapted) to reflect the nature of the specific career. For example, specific behavioral items from, e.g., a professionalism and work ethic competency may include having an attention to detail, resulting in few if any errors in their work as it relates to: ensuring accuracy when organizing and analyzing data as it pertains to research work experiences and economics work experiences, accurately calculating and recording grades as it pertains to teaching and education work experiences, accurately preparing samples for testing as it pertains to lab sciences work experiences, among other possible variations tailored for particular types of careers. Examples of items from the competency of, e.g., oral/written communications, may include, e.g., effectively use visual media to convey ideas and information as it pertains to arts and design work experiences, assist with the creation of high-quality reports and promotional materials as it pertains to business work experiences, accurately interpret and write code from technical or design specifications as it pertains to computer science work experiences, assist in preparing high-quality technical or scientific documentation as it pertains to engineering work experiences, demonstrate excellent writing, copyediting, and proofreading skills as it pertains to English and literacy work experiences, and other variations. Accordingly, a library of behavioral item question variations exists for each career.

In some embodiments, the student evaluation system 10 may access the library of behavior item question variations to select the variations pertinent to the career indicated for each student. In some embodiments, the student evaluation system 10 may select the variations for a given CR survey on a random basis from amongst the set of variations pertinent to the career. In some embodiments, the student evaluation system 10 may programmatically select the variations pertinent to the career, for example, by selecting predetermined variations for the career.

In an embodiment, the student evaluation system 10 may combine the set of general behavioral item question and set of specific behavioral item questions for a given CR survey at block 62 to produce the CR survey for a particular career to which a student has expressed interest. In some embodiments, all CR surveys may include a uniform question regarding an Evaluator's willingness to work again with the student being evaluated. Such a question may include, e.g., a yes or no option, an extent scale, or other selection.

In an embodiment, the resulting CR survey 64 is specifically tailored for a particular internship, work experience or career. Thus, the CR survey may provide career specific insights into the readiness of an individual for a work opportunity using indicators established by an analysis of a large sample of participants and quickly and efficiently generated by, e.g., a computing device, server, database, or other mechanism for selecting the general and specific behavioral items pertinent to a position. Thus, a specifically tailored measurement may be generated for each career that can be standardized across all individuals being assessed for the career for automatic quantitative measurement of career readiness.

Figure 8:
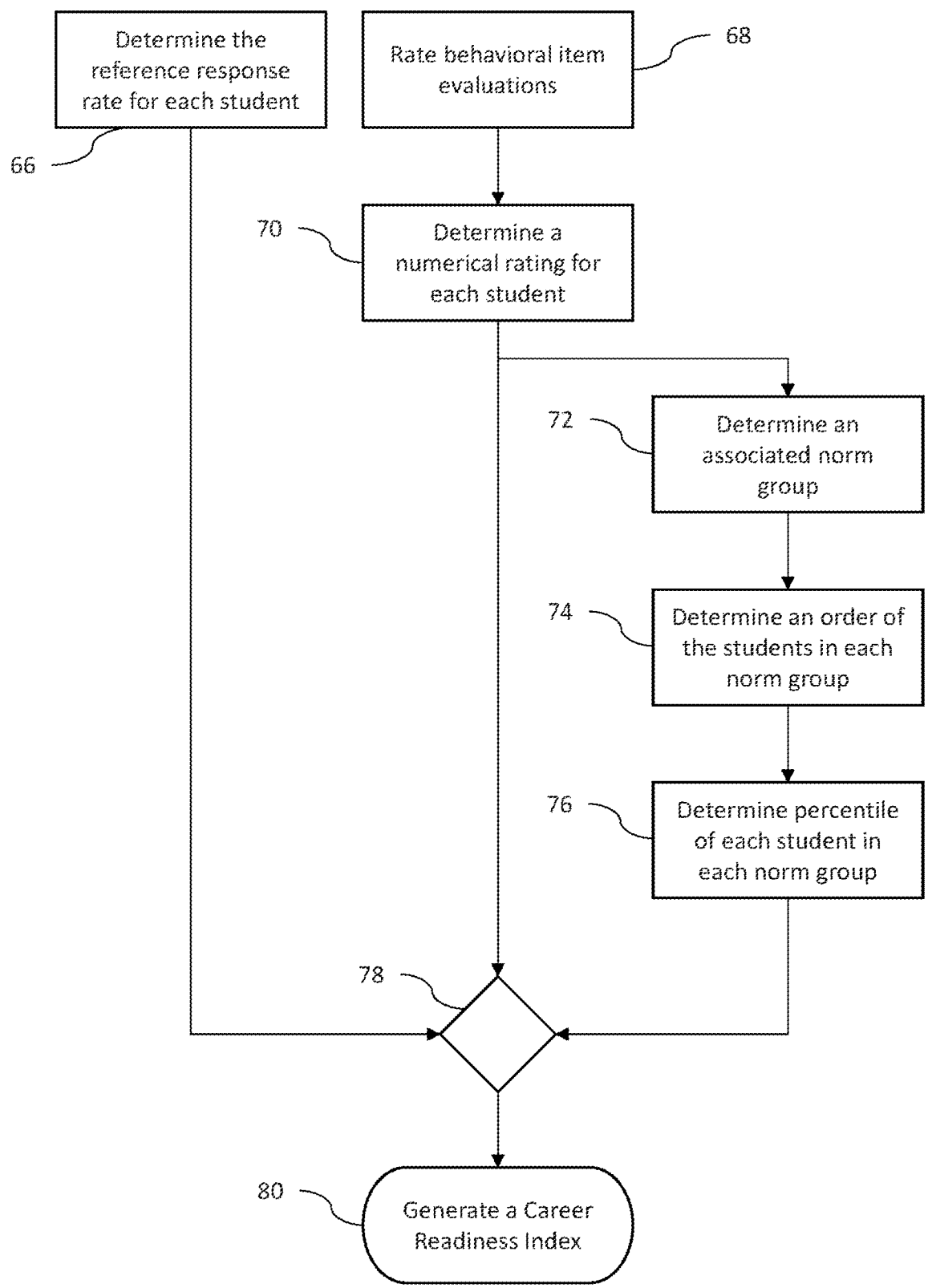

FIG. 8 illustrates a flowchart of an exemplary inventive methodology in accordance with one or more embodiments of the present disclosure.

In an embodiment, once at least, e.g., one evaluator has completed a survey for a given student, the numeric behavioral ratings are averaged to create the student's Average Numeric Rating. For example, studies of over 50,000 new hires in the workforce who were rated when they were job candidates have revealed that an, e.g., Average Numeric Rating, derived from evaluator ratings, and the percent of evaluators who comply with the evaluator request made by the job candidate, are at least two statistically significant, independent predictors of work outcomes of new hires (e.g., first year turnover for cause).

Accordingly, in an embodiment, the reference response rate for each student may be determined at block 66, e.g., in a student profile 34 of a data storage 22 via the internet 2 and I/O 12 as described with reference to FIG. 5 above. The reference response rate may include, e.g., a number of responding evaluators divided by a number of requested evaluators; however other techniques of representing compliance by the evaluators are contemplated.

In an embodiment, each responding evaluator submits a completed CR survey for a respective student with a rating for each behavioral item in the CR survey. The student evaluation system 10 may receive, at block 68, the behavior items ratings, e.g., in the form of a submitted CR survey by the evaluator.

In an embodiment, the student evaluation system 10 may determine, at block 70, the average numeric rating for each student based on an average of CR survey-specific numeric ratings for each survey response submitted for each student. Thus, in some embodiments, the student evaluation system 10 determine a numeric rating associated with each submitted CR survey response for a given student to determine the CR survey specific numeric ratings. The student evaluation system 10 may then average each CR survey specific numeric rating for a given student to determine that given student's average numeric rating.

In some embodiments, different variations of determining the average numeric rating may exist. For example, for a given student, the student evaluation system 10 may omit the CR survey specific numeric ratings by averaging the behavior item ratings across all submitted CR surveys for the given student to directly determine an average numeric rating. In some embodiments, a cumulative numeric rating may be employed instead of an average numeric rating or other statistical aggregating of evaluator ratings for a student. Other possible embodiments could include, for example, utilizing at least one statistical methodology (e.g., without limiting, averaging) for the behavioral item ratings in each CR survey separately, and then, for example, without limitation, utilizing the same or suitably different statistical methodology (e.g., without limiting, averaging) for the statistical measure(s) (e.g., averages) for each of the CR surveys provided by the evaluators to produce a numerical rating for a student, or separately applying the same or suitably different statistical methodology (e.g., without limiting, averaging) to ratings for the behavioral items corresponding to each competency to produce statistical measure(s) (e.g., averages) for competency ratings, and then applying the same or suitably different statistical methodology (e.g., without limiting, averaging) to all of the statistical measures (e.g., averages) competency ratings to produce global numerical rating (e.g., the Average Numeric Rating). In some embodiments, other suitable statistical evaluations of the behavioral item ratings may be applied to form a numeric rating of the student and/or organization (e.g., college, university, employee placement company, staffing agency, etc.).

According to aspects of the present disclosure, in some embodiments, the exemplary inventive student evaluation system may be configured to normalize numeric CR survey ratings to form the normalized ratings. For example, an exemplary normalization may involve assigning meaning of a numeric rating of, e.g., 4.0 or a 5.0 or a 6.0, and so forth. As a result, in an embodiment, an associated norm group for a student may be determined at block 72 using, e.g., an analysis program 30 in program storage 20 in the computing system of, e.g., FIG. 5 above. For example, a particular norm group is configured to provide context to the students' ratings by aggregating similarly situated students into a group for interpretation of an individual student's numeric rating. For example, based upon, e.g., the year in college, type of work experience (e.g., internship, co-op, work study), gender, institutional Carnegie classification, geographic region of U.S., domestic/international residency, first generation U.S. citizen or not, college major, specific career-readiness survey (e.g., Business, Marketing, Engineering, Clinical), among other factors, at least some embodiments of the present disclosure may utilize, e.g., about 20 norm groups, but can include as many as 75 different norm groups or more, or as little as 1 norm group with which to interpret a student's numeric (raw) ratings.

In some embodiments, a norm group is established for each core competency, for each of the CR surveys associated with, e.g., Arts & Design, Business, Clinical, Computer Science, Culinary Arts, Data Science/Mathematics, Economics, Engineering, English & Literature, Finance, General, Hotel Operations, Human Resources, Lab Sciences, Marketing/Communications, Political Science, Research, Social Services, Teaching/Education, U.S. Armed Forces, for each of the NACE competencies, for each of a set of work experience types, levels, for each of a set of demographics, for each year in college, for each gender, for each Carnegie classification, for each geographic region of U.S., for each of domestic or international residency, for each of first generation U.S. citizen or not, for each college major, according to number of career readiness surveys, among other factors suitable for classifications of students and combinations thereof. In some embodiments, the exemplary inventive platform for readiness ranking may utilize from about 1 to about 20 norm groups, or about 10 to about 100 norm groups, or other suitable number of norm groups for accurately grouping similarly situated individuals for meaningful statistical evaluation. A description/explanation of a norm group may be provided towards the end of the feedback report on each student.

In an embodiment, interpretation of the numeric rating may include determining an order of the students in each norm group at block 74 according to each student's numeric rating. For example, within each norm group, tens of thousands of numeric ratings, representing tens of thousands of students, are ordered from lowest to highest numeric rating.

In an embodiment, the order of the students in a norm group may be used to determine a percentile of each student in each norm group at block 76, and stored, e.g., as a benchmark 36 of the data storage 22 of a computing system of, e.g., FIG. 5 above. In an embodiment, the order of the students may be statistically converted to a percentile based upon the distribution of numeric ratings provided by the students' evaluators. For example, percentiles range from 1-99, and if an individual's numeric rating is in the 80th percentile, this means that 80% of all students in this norm group were rated lower than the individual in question. In an embodiment, a description/explanation of a percentile may be provided towards the end of the feedback report on each student.

In an embodiment, regardless of the CR survey used, the numeric ratings for all students with work experiences are normed against data that exist in, e.g., an entry-level professional job candidate norm group. For example, an illustrative entry-level professional norm group may contain numeric ratings, e.g., average numeric ratings, of N=87,000 job candidates applying for a wide variety of jobs that are represented in the U.S. workforce. In an embodiment, some of the top positions for which job candidates are applying in this norm group may include: administrative assistant; apprentice; courier; data entry; intern; laboratory assistant; office support; production technician; research assistant; sales associate; student help; student intern; technician; temp help; and unit coordinator. In an embodiment, the entry-level professional job candidate survey may be used by the majority of all interns submitted by SkillSurvey's corporate customers.

In some embodiments, percentile of the numeric rating, such as an average numeric rating, and percent of evaluators complying with the evaluator request of job candidates at pre-hire are correlated with first-year turnover of new hires in our predictive validity studies (see Table 1).

TABLE 1

| | <80% of evaluators comply with survey request | >=80% of evaluators comply with survey request |
|---|---|---|
| Percentile associated with numeric rating: $1^{st}$-$5^{th}$ | 9.6% | 5.3% |
| Percentile associated with numeric rating: $6^{th}$-$34^{th}$ | 6.9% | 4.7% |
| Percentile associated with numeric rating: $35^{th}$-$99^{th}$ | 5.9% | 3.4% |

Those job candidates with average numeric ratings associated with percentiles between 35th-99th and evaluator response rates >=80% show the lowest incidence of being fired for cause (3.4%) within the first year of hire. Those with average numeric ratings associated with percentiles between 1st-5th and evaluator response rates <80% show the highest incidence of being fired for cause (9.6%) within the first year of hire. In some embodiment, CR survey responses are collected and may be combined with survey responses of job candidates, and first-year work outcomes of those job candidates who are subsequently hired. However, the CR surveys for students may be maintained separate form the job candidates, norms are created based upon feedback data provided on this sample of students alone.

Thus, in some embodiments, a combination of a percentile of numeric rating and reference response rate may be relevant to an indication of career readiness as indicated by termination rate of job candidates in the first year. In embodiments, numeric rating itself may also indicate a degree of career readiness. In some embodiments, other evaluation data may also be collected and used in addition to response rates and numeric ratings to indicate career readiness. For example, where the CR surveys include the question described above regarding the Evaluator's willingness to work with the student again, the student evaluation system 10 may determine, for each student, a proportion of Evaluators that indicate a willingness to work with the student again. In some embodiments, the willingness to work with the student may instead use an extent scale, and the student evaluation system 10 may determine an average rating for a student regarding evaluators' willingness to work with the student. Other embodiments are also contemplated.

Accordingly, in an embodiment, the reference response rate, the average numeric rating, the percentile for each student, reference response rate, and other metrics, including willingness-to-work metrics, are combined at 78 to generate a Career Readiness Index (CRI) 80 using, e.g., a CPU 18 and an analysis 30 of a student evaluation computing system of, e.g., FIG. 5 above. In some embodiments, the CRI forms a customized metric for each career for measuring the career readiness of individuals based on numerical rating without disclosing leaking personal data. In an embodiment, the combination of the average numeric rating, percentile and reference response rate may be generated according to, e.g., equation 1 below:

$$CRI=(ANR)*100+(RRR)*100+(PropWork WithYes)*100+(PercentileForEntryLevel)*100, \quad \text{Equation 1:}$$

where ANR is the Average Numeric Rating, RRR is the reference response rate, PropWorkWithYes refers to a proportion of evaluators that indicated, e.g., on a survey, a desire/agreeability to work with the student again, e.g., via a question presented as an item in the CR survey for a student, and PercentileForEntryLevel refers to the percentile of the students ANR in a corresponding norm group. In an embodiment, Equation 1 may include, e.g., weightings for each term to adjust importance for career readiness. Additional terms and fewer terms are also contemplated.

In some embodiments, equation 1 can include more or fewer variables. For example, in some embodiments, equation 1 includes a variable for, e.g., a difference between a self-rating and evaluator rating overall, at the level of the competency cluster, and, at the level of the individual behavioral item, among others, and combinations thereof. Thus, in some embodiments, the equation is modified to include a self-other term by, e.g., adding a self-other rating multiplied by 100. The analysis may include, e.g., a cumulative analysis, norming of the data (e.g., ratings, difference scores, response metrics), percentile of the student's Evaluator ratings compared to that of other students, percentile of the student's Evaluator ratings compared to those of job candidates, percentiles associated with the student's self-rating, percentiles associated with Evaluator vs. student difference scores, percentiles associated with career outcome measures, ranking, weighted averages (from both Evaluator and self) according to each of the NACE competencies, or other analyses and combinations thereof.

Similar to the Average Numeric Rating, students' data may be normed for self-other ratings by, e.g., creating a norm group of students' self-other ratings as described above. A ranking and percentile of the self-other ratings can be determined from rating data in the norm group and used as further measures of career readiness, for using in a CRI equation, such as, e.g., equation 1 above. For example, equation 1 can be modified to include a self-other rating (SOR), and a self-other percentile (SOPercentile), such as in equation 2 below:

$$CRI=(ANR)*100+(RRR)*100+(PropWork WithYes)*100+(PercentileForEntryLevelJobCandidate)*100+(SOR)*100+(SOPercentile)*100. \quad \text{Equation 2:}$$

Additionally, in some embodiments, the resulting CRI values, e.g., from equation 1 or equation 2, can be normed, such as described above, to norm the CRI against similarly situated individuals. Thus, similar to the Average Numeric Rating, a ranking and percentile within a group of similarly situated individuals can be determined for the CRI. Accordingly, in some embodiments, an end user such as, e.g., an educational institution, a student, or other end user, can view a ranking within a group of similarly situated individuals to better determine career readiness in the context of a representative sample of individuals.

In an embodiment, the CRI may be provided to a student, prospective employer, educational institution, or other relevant party via a display and a web interface, such as via a display for one or more of the computers 15 of FIG. 5, or the client devices 102-104 or client devices 202a-202n of FIGS. 1 and 2, respectively. Using the CRI, a student or organization may easily and quickly assess a student's career readiness according to demonstrated work competencies. Moreover, in some embodiments, organizations and educational institutions may assess organizational performance in preparing students for a career or job position. For example, in an embodiment, a student's CRI may be stored in an educational institution or university database according to an association between the student and the educational institution. The educational institution may evaluate the CRIs of students in the database to assess the overall career readiness of the student body to determine the institution's performance.

Additionally, in an embodiment, a student's ratings with respect to each behavioral item and with respect to each competency may also be stored and displayed to a user for more specific feedback on areas of work-related strengths or improvements. In an embodiment, a combination of the CRI with other information, such as behavioral item ratings and competency ratings, as well as open-ended responses from evaluators may form a report that includes the overall assessment of the student's competency in each of the several competency areas and includes any comments supplied by the evaluators. Competency may be a well-known concept that represents a particular characteristic of an individual or organization performing a task, function or project at a particular point in time that leads to successful performance.

Figure 9:
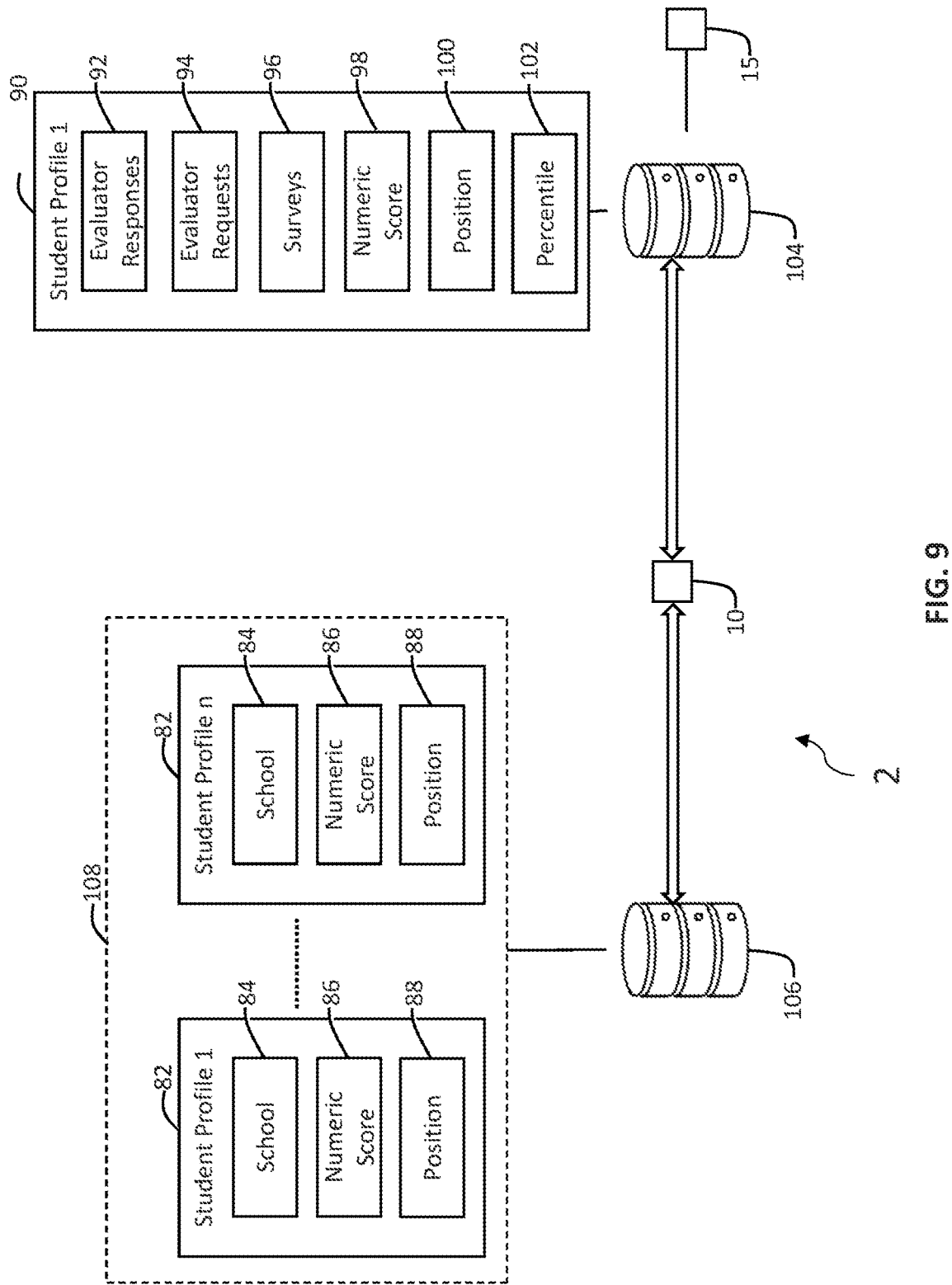

FIG. 9 illustrates an exemplary student evaluation system 2 for assessing student career readiness according to an illustrative embodiment of the present disclosure.

In an embodiment of the present disclosure, the exemplary inventive student evaluation system 2 includes an educational institution computing device 15 in communication with an educational institution database 104 for storing student profiles of students at the educational institution. In an embodiment, only educational institution computer devices 15 of the university associated with the educational institution database 104 has permission to access the educational institution database 104. Moreover, in an embodiment, only selected personnel and the respective student may access a particular student profile 90 in the educational institution database 104. Using the student assessment system 10, e.g., as described above with reference to FIG. 5, the educational institution database 104 compiles the student profile 1 90 associated with a respective student with similar profiles for every other participating student. In an embodiment, the student profile 1 90 includes data related to the request, reception and analysis of CR surveys from evaluators from which the student has requested evaluation. Accordingly, in an embodiment, the student profile 1 90 may include survey request fields for identifying and tracking the student's evaluator requests 94, including, e.g., a number of evaluator requests, the relationship of the evaluator to the student (e.g., supervisor, co-worker) as well as evaluator responses 92, including, e.g., a number of evaluators that responded to the evaluator requests 94. Additionally, in an embodiment, the student profile 1 90 includes CR survey fields and ratings fields to identify and track the CR surveys 96 with each evaluator's ratings included, as well as a numeric score 98 based on the CR surveys 96 and the selected career 100.

In some embodiments, the educational institution database 104 may be in communication with a student evaluation computing device 10, similar to, e.g., the student evaluation system 10 described above with reference to FIG.

5. In an embodiment, a student evaluation database 106 compiles data on students, such as student profiles, from across multiple educational institution databases 104 and/or databases for other organizations, e.g., up to 10, up to 100, up to 1000, up to 10000, or up to any suitable number of educational institution databases 104.

Thus, the educational institution database 104 and the student evaluation database 106 may share student profiles and other student data via, e.g., a network connection including, for example, the internet or other wired or wireless network. However, in an embodiment, only the student assessment computing device 10 may access the student evaluation database 106. Thus, the student profiles 82 cannot be accessed by other educational institutions. In this way, the student profiles 82 are protected from access by educational institutions other than each student's respective educational institution by restricting the permissions of each educational institution to only the corresponding educational institution databases 104. Accordingly, sending the student profiles to a remote student evaluation database 106 facilitates a separate, specific location for anonymous aggregation of data while still being able to associate each student profile with a specific educational institution database 104 that can, in turn, associated the profile with a specific student. Thus, this arrangement of the educational institution databases 104 and the student evaluation database 106 enables the privacy benefits of local student profile evaluation while also having the benefits of larger scale, multi-educational institution evaluation. Accordingly, individual data privacy is improved while enabling the evaluation of student profiles across a larger population for better determination of a student's career readiness using a technology-based solution to overcome data privacy problems when evaluating profiles across multiple organizations.

In an embodiment, included in the compiling, the student evaluation database 106 may aggregate student profiles 1 through n 82 into a norm group 108. The norm group 108 includes student profiles 1-*n* 82 that are comparable to other students. Here, comparable refers to similar CR survey chosen. The number of student profiles 82 in the norm group 108 may vary according to a number of participating educational institutions, a number of participating students, and the breadth of the norm group 108. However, in some embodiments, analysis in the norm group 108 may be restricted to only where the norm group 108 has a minimum number of respective students. For example, the minimum number of students may be any threshold for determining statistically significant analysis according to, e.g., a desired confidence interval, such as a minimum of about 900 students are present in the norm group 108. In some embodiments, the minimum number of students in the norm group 108 can include, e.g., about 125, however, the minimum may also be, e.g., about 100, about 200, about 1000, about 10,000, or any other suitable threshold amount. Comparisons in each of these norm groups are facilitated by the present arrangement of the databases that enable aggregating student profiles from many different educational institutions while maintaining data privacy, thus leveraging a technology-based solution to the problem of data disclosure when cross analyzing data from multiple different systems.

Accordingly, in an embodiment, the student profiles 82 may include respective student educational institution 84 to associate a given student with a given educational institution schools, numeric score 86 determined based on evaluator rating in job specific surveys, and position sought 88, among other suitable information, such as experience level, education level of other information. However, in some embodiments, to protect student and evaluator identity and privacy, information related to the evaluators requested by the student as well as student identifiable information are stripped from the student profiles 82 prior to being entered into the norm group 108. To protect organization privacy, the student profiles 82 may be stripped of the educational institution's 84 information prior to entry into the norm group 108. Alternatively, in some embodiments, the aforementioned stripped information may be maintained in the student profiles 82, but the data in the norm group 108 may be kept confidential. Thus, the educational institution 84 data may be used to associate a student with an educational institution such that the educational institution, and only the educational institution, may view the respective student profile 82 and any anonymized data related to the respective student profile's 82 performance relative to other student profiles 82 in the norm group 108. Therefore, the arrangement of the student evaluation database 106 allows for data privacy to be dictated by each individual educational institution database 104 for the respective student profiles of each respective educational institution database 104. Using the separate student evaluation database 106 provides a secure system for confidentially evaluating each student profile relative to many other student profiles, the results of which may then be returned to each educational institution database 104 without compromising the privacy of any of the educational institution databases 104 or student profiles, thus providing a technology-based solution for combining the benefits of centrally aggregated data for evaluation and analysis, while maintaining the data privacy of many independent entities and independent systems.

In an embodiment, the student evaluation database 106 may include more than one norm group 108. In some embodiments, however, each norm group 108 may be stored in a respective norm group-specific student database 106. The number of norm groups 108 may be, e.g., any amount of norm groups 108 representative of the type of work experience or of internship, year in college, college major, Carnegie classification of the educational institution, geographical region, being a first generation student, gender, etc. In an embodiment, there are 75 norm groups 108, however, other amounts are contemplated, such as a number of norm groups 108 in a range of about 10 to about 75, or from about 5 to about 200, or other suitable range of norm groups 108. Where a norm group 108 may be created for, e.g., year in college, but a minimum threshold of students in the norm group 108 for normalization may be not achieved, the students may be associated with another, similar norm group 108, such as the next closest year in college, until more students for the norm group 108 are entered. Thus, in some embodiments, the number of norm groups 108 varies according to the students.

In an embodiment, the student profiles 82 may be assessed for performance by comparing and analyzing each student to normalize each student's performance according to, e.g., numeric score 86. For example, in some embodiments, the student profiles 82 in the norm group 106 are ordered according to numeric score 86. A percentile 102 for each student may then be determined and reported back to the educational institution database 102 associated with the educational institution 84 for each student profile 82 to be added to the student profile 90. Thus, each educational institution receives only percentile 102 determinations for students associated with the respective educational institution and other educational institutions cannot view information about students with which they are not associated.

In an embodiment, the student database 106 may analyze the percentile of each student profile 82 in each norm group 108 for each educational institution to determine a percentile of the educational institution relative to other participating educational institutions. Thus, an indication of the performance of each educational institution may be determined from the performance of respective students. In particular, an educational institution or other participating institution may request to be compared to a norm group that represents "aspirational" educational institutions to evaluate performance relative to selected educational institutions.

As a result, an educational institution, such as a university, may include percentile in the student profile 90. In an embodiment, the student profile 90 may be used to assess both the student's career readiness, as well as the educational institution's performance in readying the student for a career relative to other educational institutions without access to performance information or student information associated with the other educational institutions. Thus, confidentiality may be protected while still providing useful and actionable performance data of both students and educational institutions. While the exemplary inventive student evaluation system 2 of FIG. 9 may be described with reference to universities, the exemplary inventive student evaluation system 2 may be equally applicable to students from, e.g., high schools, trade schools, colleges, university or college departments, professional organizations, employers, internship programs, or any other entity that may benefit from an assessment of student career readiness.

Figure 10:
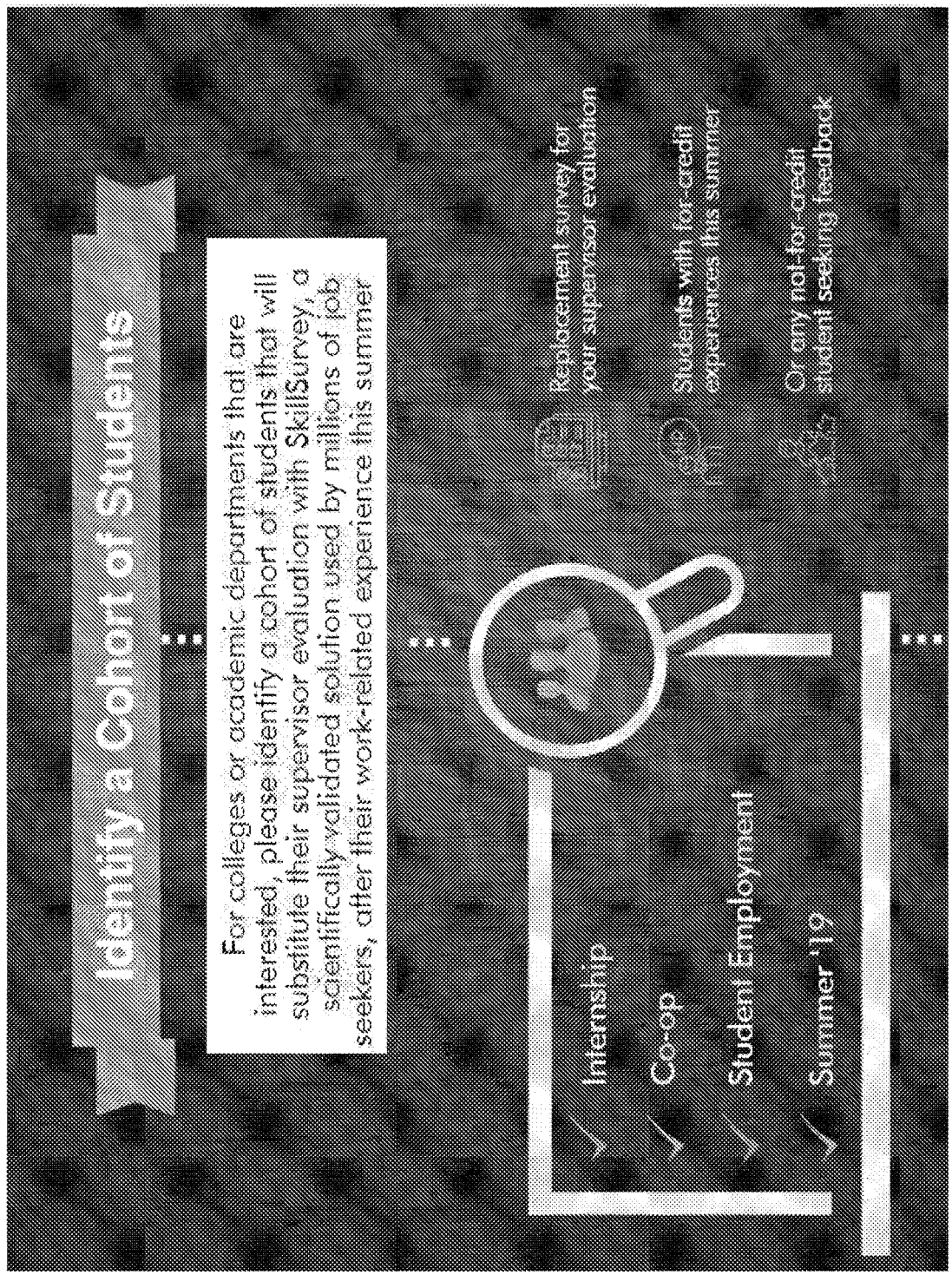

FIG. 10 illustrates the identification of a cohort of students for career readiness analysis according to an embodiment of the present disclosure. Identifying the cohort may include, e.g., the identification of students obtaining work-related experience while not at school in a given year, e.g., over the summer. Such work-related experience may include, e.g., internships, co-ops, student employment, work-study, among other work-related experiences. The work-related experience may be for-credit or not-for-credit. The work-related experience may be for pay or not for pay. However, in an embodiment, the student may obtain a CR survey of behavioral items rated by a supervisor or co-workers, such as the surveys described above.

Figure 11:
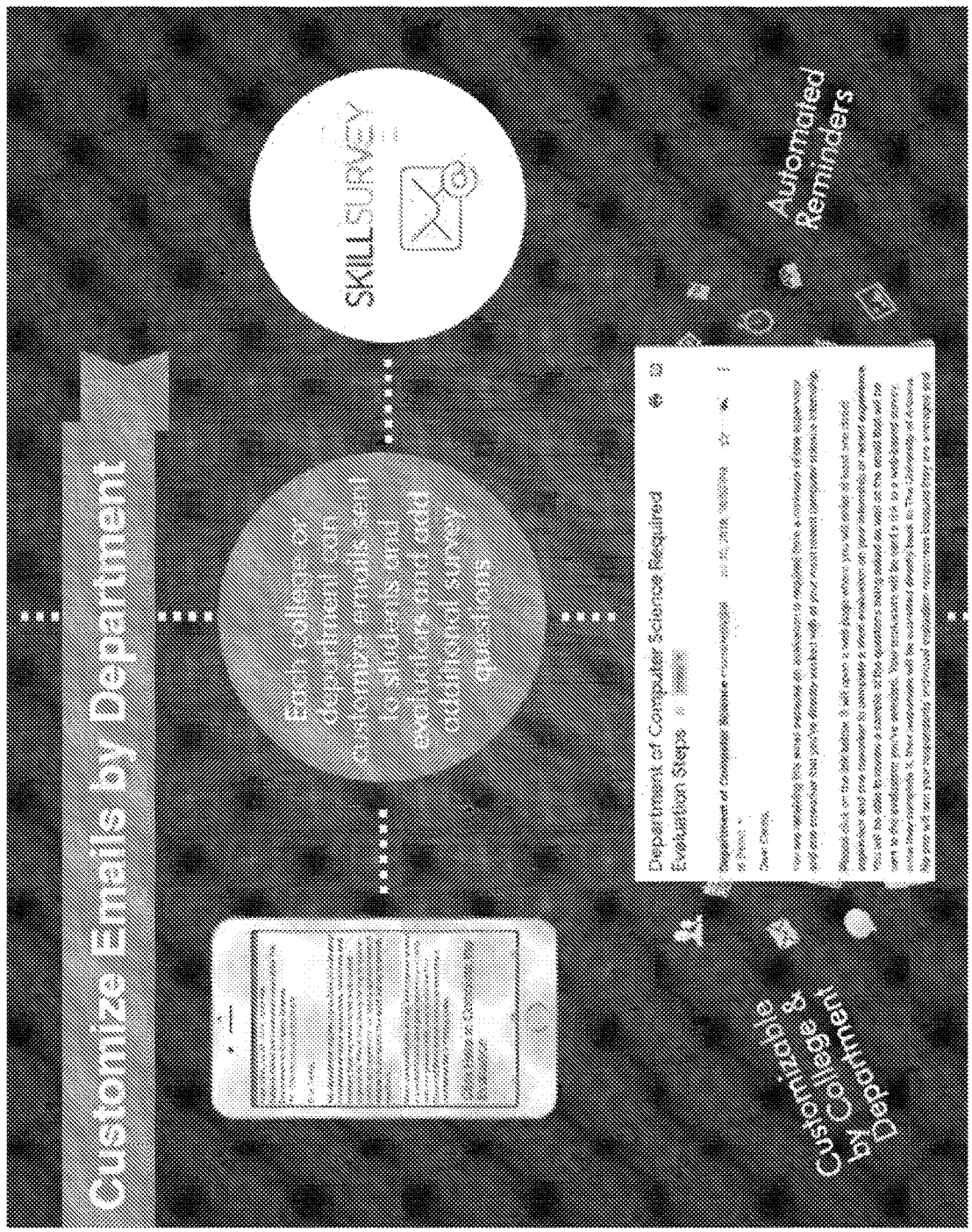

FIG. 11 illustrates survey emails for student and evaluator feedback according to an embodiment of the present disclosure. The emails may request that an individual read the survey and rate each behavioral item included therein. In an embodiment, the CR survey may be customized to a position type, e.g., a career field of the work-related experience of the student. Thus, in an embodiment, the email may likewise be customized according to the department seeking feedback and/or the student's work-related experience for which the feedback pertains. Moreover, in an embodiment, the emails may be configured with automated reminders to complete and return CR surveys.

Figure 12:
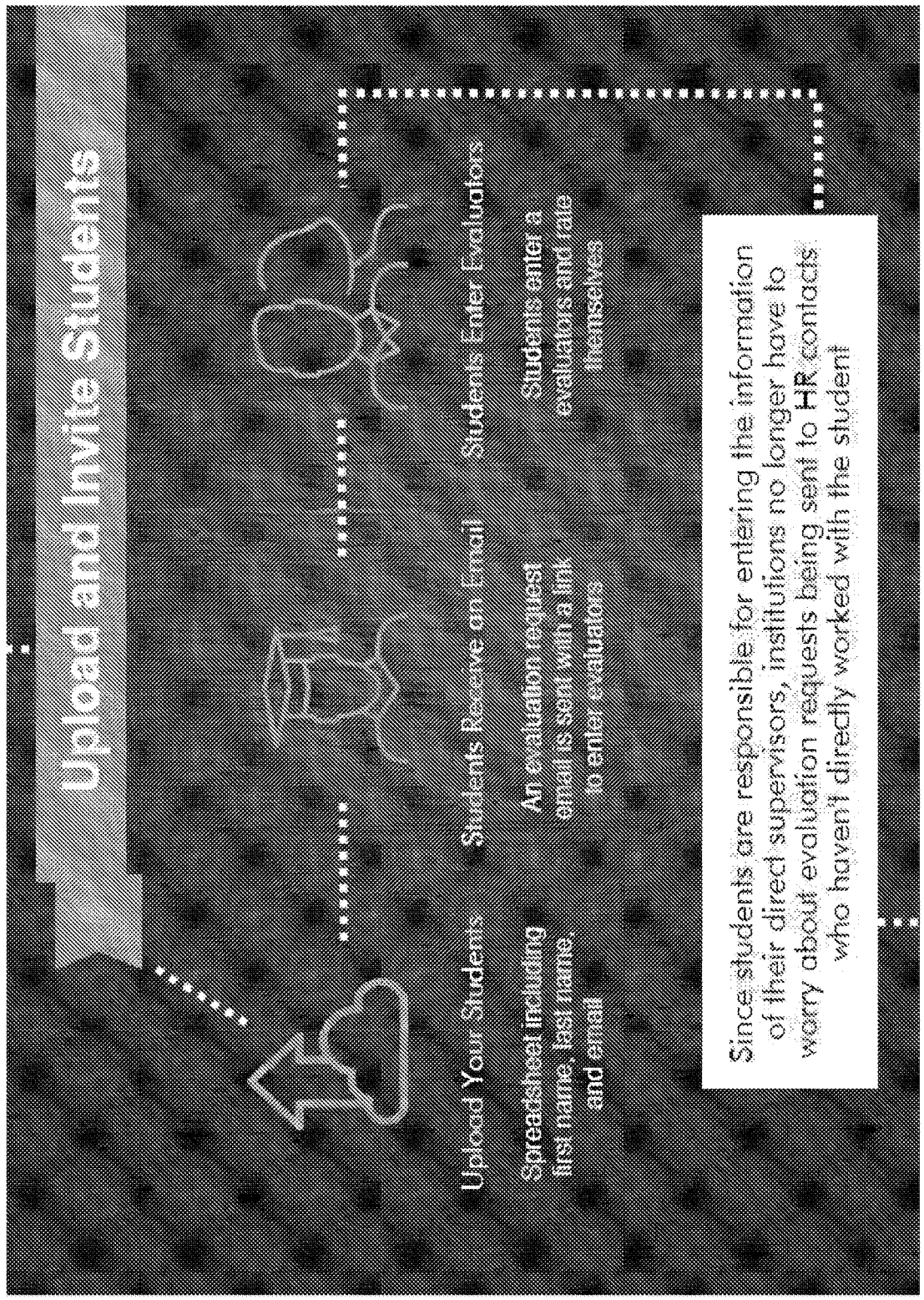

FIG. 12 illustrates a process of inviting students and sending survey requests according to an embodiment of the present disclosure. An entity, such as an educational department placing students for work-related experience, may invite students to participate in the CR survey process for career readiness evaluation by, e.g., uploading a spreadsheet of student contact information, such as name and email address. In an embodiment, an email invitation may be automatically sent to the students in the spreadsheet with a link to enter evaluators. The students may then enter evaluators to request survey feedback in relation to the work-related experience. The survey requests may be automatically sent to the requested evaluators without intervention by, e.g., an educational institution, hiring manager, or other personnel.

Additionally, in an embodiment, the student may fill out the CR survey to rate themselves, such as described above. In an embodiment, the student fills out a self-assessment including rating for the CR survey that is sent to evaluators of the student. A self-other rating can be determined according to a difference between the self-assessment and the evaluator assessments. The self-other rating may be determined by finding a difference between the self-assessment and the evaluator ratings by determining, e.g., a difference between a self-assessment rating and an average evaluator rating, an average difference between corresponding behavior items of the self-assessment and each evaluator response, a difference between clustered ratings for a self-assessment and an evaluator response, among others and combinations thereof. As described above, in embodiments, the student may be normed in a similar fashion to the Average Numeric Rating, included in the CRI calculation, and other subsequent uses of the self-other ratings, and combinations thereof.

Figure 13:
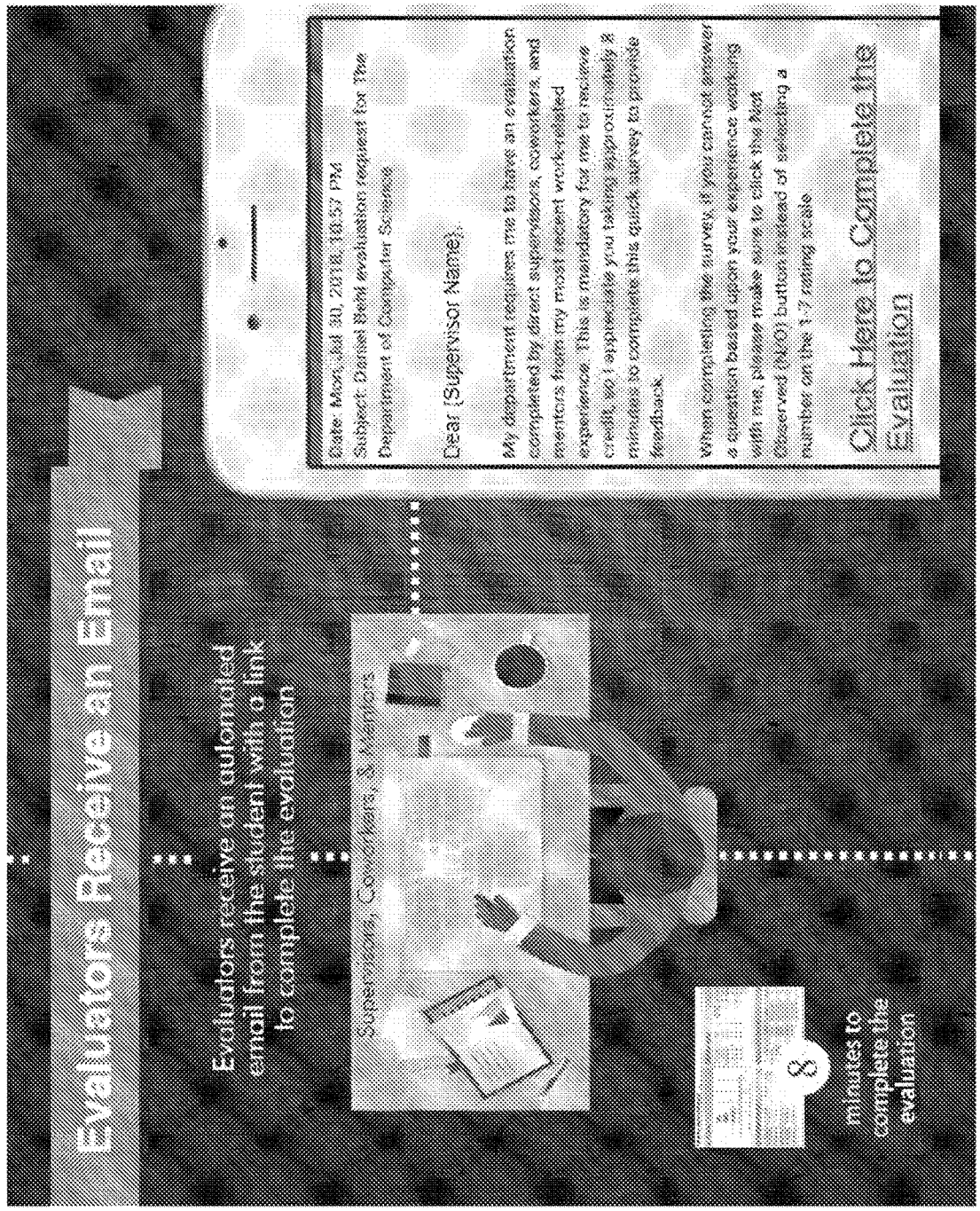

FIG. 13 illustrates the reception of an email to complete a survey for a student according to an embodiment of the present disclosure. In an embodiment, the evaluators receive an automated email with a link to a survey to evaluate a student. The email may be an email automatically sent upon the student designating evaluators, as described above. In an embodiment, the email also includes instructions for rating the student in the survey, such as, e.g., instructions for using a numerical "extent" scale to rate an extent to which a student has demonstrated the behavioral item indicated by a question of the survey on a scale from, e.g., about 1 to about 7, or any other suitable scale. According to an embodiment, the instructions further specify that for behavioral items for which the evaluator has no experience, to select an alternative option, e.g., "N/O" for not observed.

Figure 14:
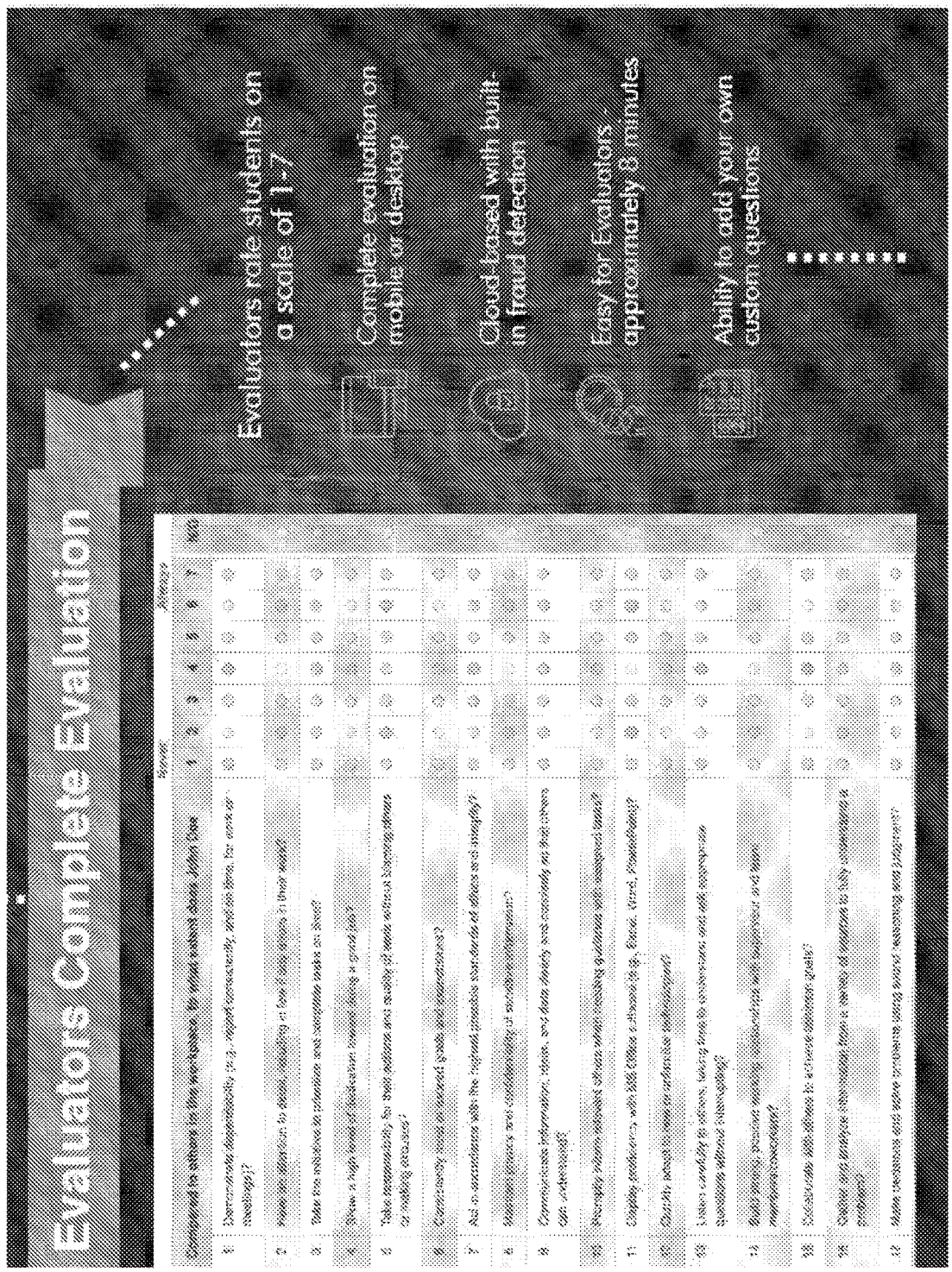

FIG. 14 illustrates an evaluator survey according to an embodiment of the present disclosure. In an embodiment, the CR survey may be designed to take a short time to complete, such as, about 8 minutes. However, completion times are contemplated, e.g., between about 1 minute and about 20 minutes per survey, such that the CR surveys are convenient for an evaluator to respond to while also eliciting sufficient information from the evaluators to facilitate effectively characterizing a student's work performance, e.g., across the NACE competencies. Thus, the CR surveys are designed to return sufficient information to the exemplary inventive system with respect to applicable behavioral items upon completion by evaluators without discouraging participation by the evaluators.

In an embodiment, the CR survey may be cloud based and accessible via an internet browser on mobile or on desktop browsers. In an embodiment, to protect the information of the student and the evaluator, as well as to facilitate authentic evaluations, the cloud in which the CR survey is maintained may include built-in fraud protection.

In an embodiment, the participating educational institution or other client has the option to add additional questions not already included in the CR survey. For example, where the participating educational institution or other client wishes to receive feedback on a student's work performance that may be not captured by the pre-defined behavioral items, the participating educational institution or other client may add a question for the evaluator to rate the student according to, e.g., a numerical "extent" scale and/or with qualitative comments expanding upon the evaluation of the student.

Figure 15:
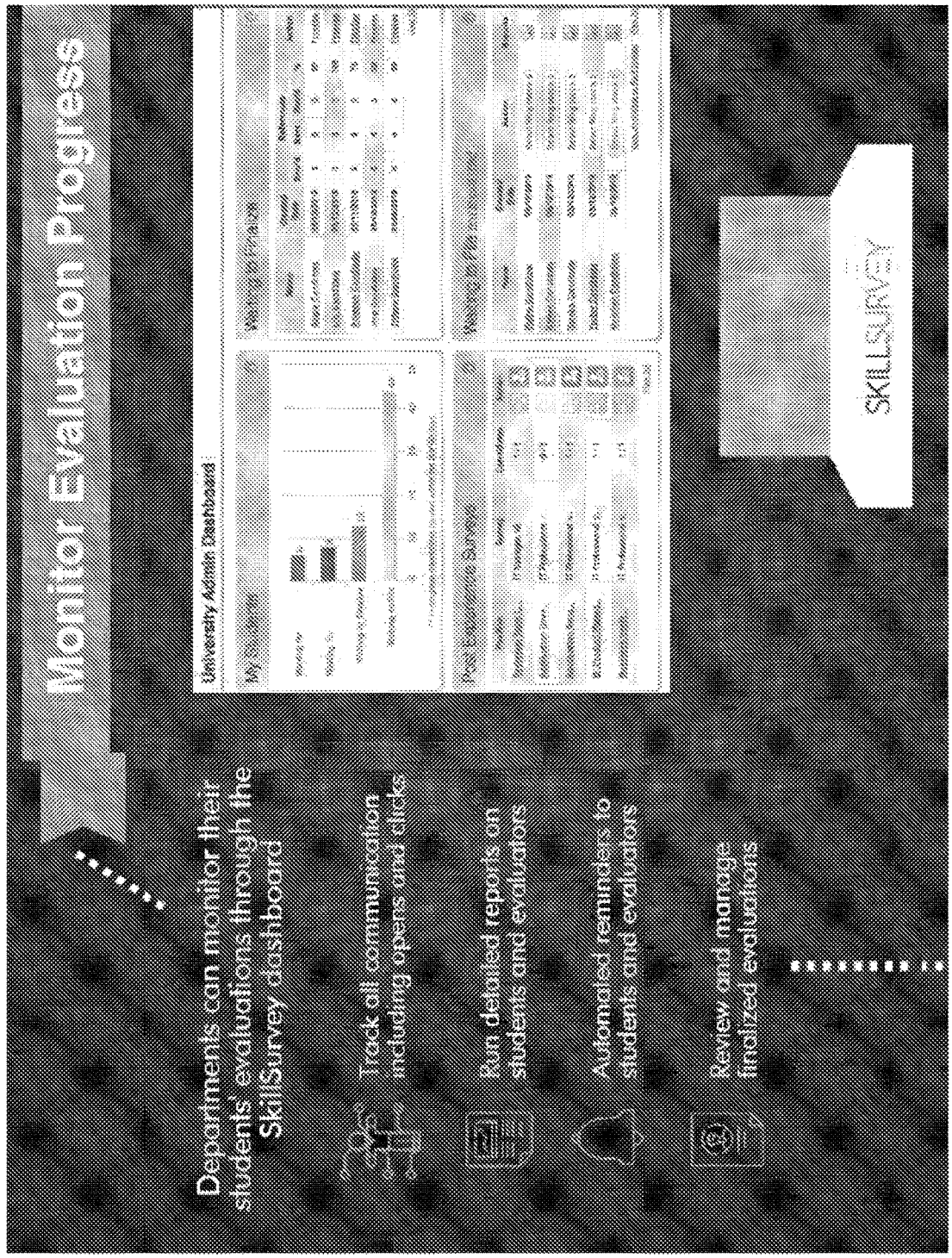

FIG. 15 illustrates a dashboard to monitor student evaluations for educators according to an embodiment of the present disclosure. In an embodiment, the dashboard may include windows to track communications, including opens and clicks for CR surveys and emails. In an embodiment, a window may be presented that represents student evaluation statuses, such as requested evaluations, pending evaluations, completed evaluations, and/or other statuses. Additionally, in an embodiment, the dashboard may post detailed reports on students and evaluators as well as send automated reminders to students and evaluators according to statuses. The dashboard may also include functions to review, manage and/or finalize evaluations, including lists of evaluations waiting to be finalized and/or filed.

Figure 16:
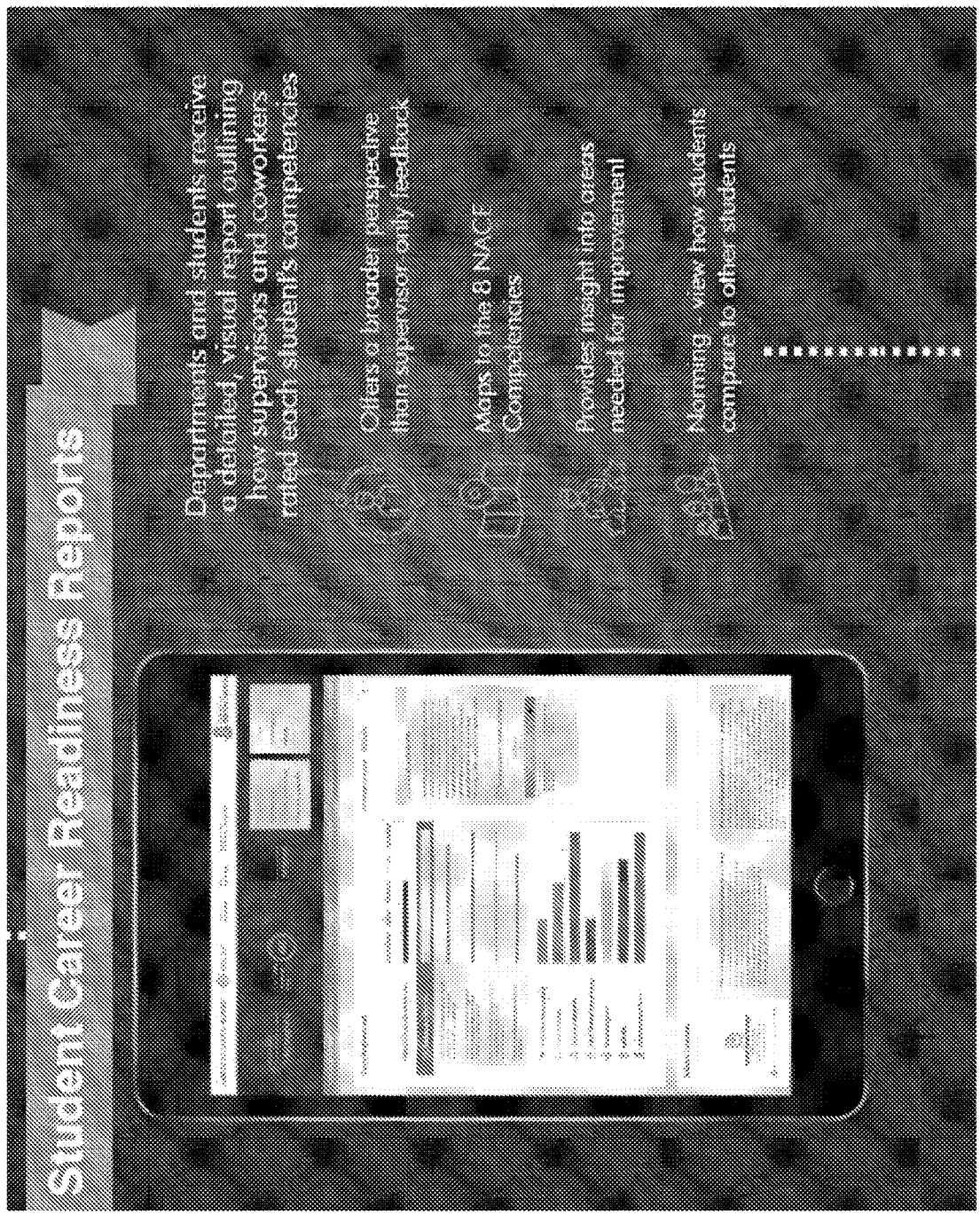

FIG. 16 illustrates a career readiness report according to an embodiment of the present disclosure. In an embodiment, the student evaluation survey system may include career readiness reports, including a detailed report and a report summary. The report summary may offer a broader perspective than supervisor-only feedback, while the detailed report may provide detailed visual report outlining how supervisors and coworkers rated each student's competencies, both on average per competency and with supervisor-only feedback.

In an embodiment, the reports map feedback to competencies, such as the NACE competencies, an ability to work remotely, or other competencies such as those described above. Such a mapping may facilitate insight into areas needed for improvement. In an embodiment, the mapping of feedback also includes norming of the survey ratings to facilitate with meaning for the survey responses in light of similarly situated students.

Figure 17:
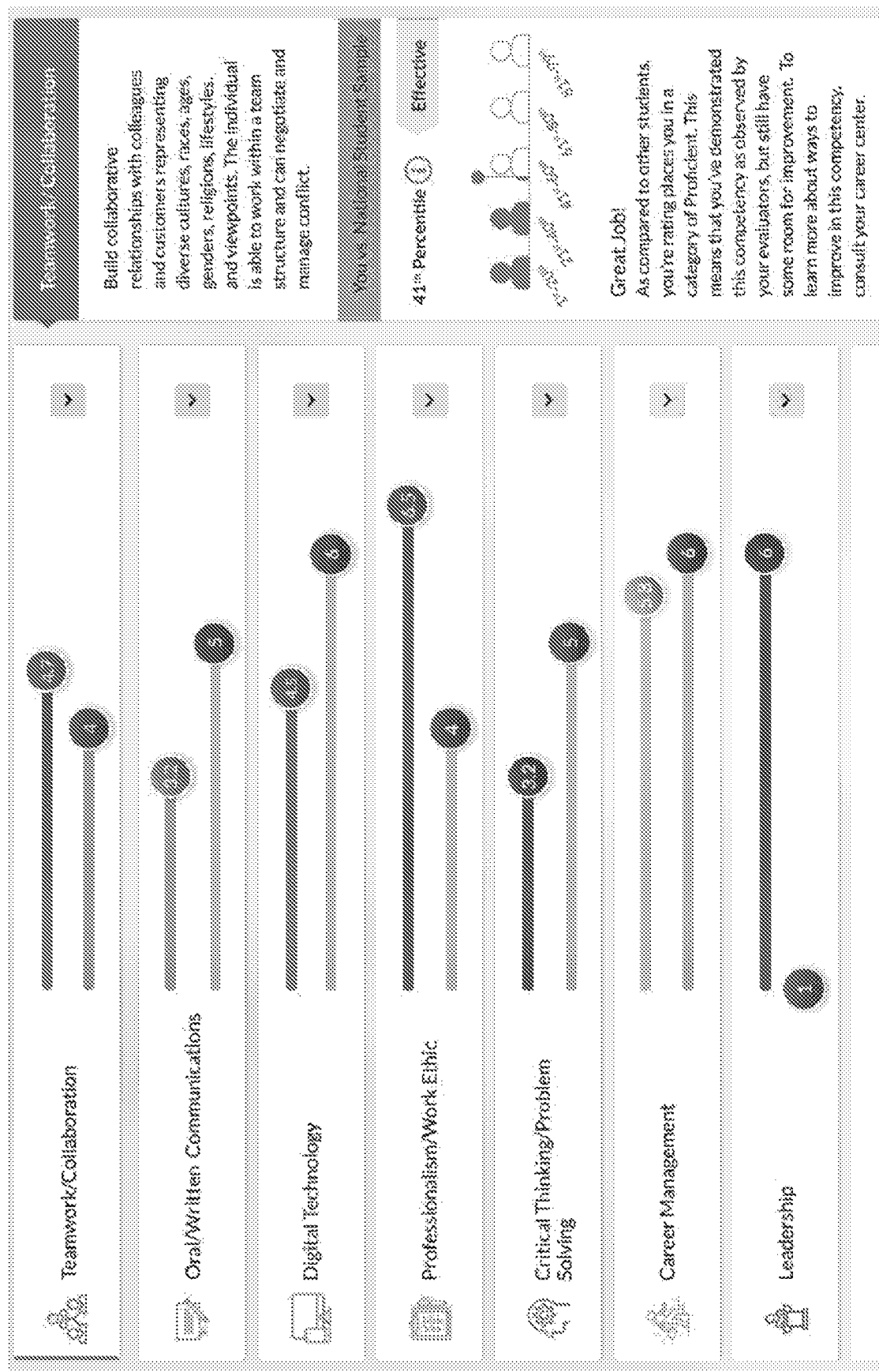

FIG. 17 illustrates a detailed career readiness report according to an embodiment of the present disclosure.

In an embodiment, report includes the overall assessment of the student's competency in each of the several competency areas and includes any comments supplied by the evaluators. For example, the exemplary inventive student evaluation system may be configured to determine the competency as an indicator of a particular characteristic of an individual or organization performing a task, function or project at a particular point in time that leads to successful performance. The report may be a final report with all CR surveys completed by the evaluators, or it may be a real time interim report with analysis of a partially completed CR survey information which may be requested by the hiring manager at any time.

In an embodiment, the report may also include a comparison between a student's self-assessment and evaluator responses, as well as qualitative summaries of a student's performance with regards to one or more of the competencies. Thus, the report provides a detail view of a student's career readiness, with actionable data for hiring managers, educators and students, including an overall ranking of career readiness, and granular rankings across competencies and behavioral items, and relationship of evaluator to the student (e.g., supervisor, coworker, etc.).

Figure 18:
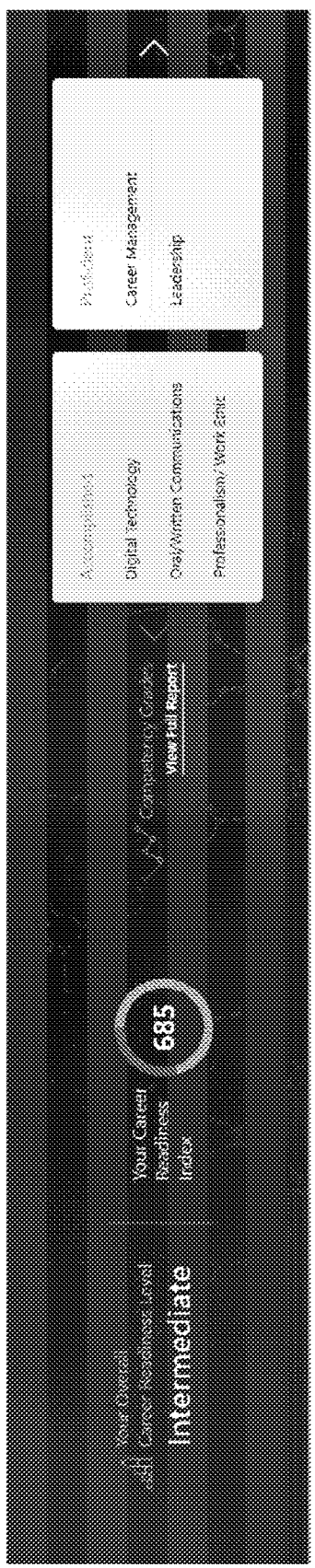

FIG. 18 illustrates a career readiness report summary according to an embodiment of the present disclosure.

In an embodiment, the career readiness report summary may include, e.g., an easily understandable at a glance indication of CRI. For example, the indication may include, e.g., a circle with a color-coded progress ring around the perimeter of the circle. The progress ring may have a color associated with CRI, as well as a progress around the circle, e.g., clockwise starting at a top center point of the perimeter of the circle, associated with the CRI. For example, for a CRI of, e.g., 900 out of 999, the indicator may have a green color that almost fully encircles the indicator, whereas a CRI of, e.g., 685 out of 999 may have an orange color extending approximately three quarters of the way around the indicator. However, any other color scheme can be employed. Thus, the indicator includes two factors of visual indication to easily understand the degree to which a student may be career ready. However, in an embodiment, the indicator may also include a numerical indication of the CRI in the center of the indicator.

Additional indicators of career readiness may be presented. For example, a qualitative assessment of a student's overall career readiness with respect to a norm group may be included. Such a qualitative assessment may include, e.g., a competency group label that identifies a segment of the norm group in which the student falls, such as, e.g., emerging, effective, proficient, accomplished, advanced, and/or other group labels sufficient to assess a student's CRI.

Additional summary details may be included in the career readiness report summary. For example, in an embodiment, the summary includes a list of competencies in which the student has best performed, such as, competencies in which the student has received an "advanced" label. Similarly, a student's competency developmental areas may also be presented, such as competencies for which the student has received an "emerging" label. The summary may also include a link to the full summary for more in-depth presentation of the student's placement in categories of career readiness in various areas.

It is understood that at least one aspect/functionality of various embodiments described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

As used herein, the term "dynamically" and term "automatically," and their logical and/or linguistic relatives and/or derivatives, mean that certain events and/or actions may be triggered and/or occur without any human intervention. In some embodiments, events and/or actions in accordance with the present disclosure may be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, statistical software programs, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users (e.g., students, evaluators, educational institution administrators, etc.) that may be, but is not limited to, at least 100 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000, 000 (e.g., but not limited to, 1,000,000,000-10,000,000,000) and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device may include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session, or may refer to an automated software application which receives the data and stores or processes the data.

At least some aspects of the present disclosure will now be described with evaluator to the following numbered clauses.

Clause 1. A method, including:
    generating a student profile in an educational institution database for each student of a plurality of students associated with the educational institution;
inputting, by a processor, an employment position into the student profile of each student;
    determining a CR survey and a norm group associated with each student profile based on the employment position;
    transmitting the CR survey associated with each student to at least one evaluator for each student;
    receiving a response with a rating for each question in the CR survey from the at least one evaluator of each student;
    generating a numeric rating for each student based on the rating for each question in the CR survey from each evaluator;
    transmitting each student profile with the numeric rating to a student assessment database;
    where student profiles from a plurality of educational institutions are aggregated into respective norm groups
    where the student assessment database is configured to aggregate the student profiles from a plurality of universities into respective norm groups and determine a percentile rank of each of the students from each of the plurality of educational institutions within the norm group according to the numeric rating;
    receiving at the educational institution database the percentile rank of each student associated with the educational institution from the student assessment database;
    determining a response rate for each student based on a number of responding evaluators of the at least one evaluator;
    generating a personalized career readiness index for each student based on the response rate, the percentile rank and the numeric rating associated with each student;

displaying the career readiness index of one or more of plurality of students to a user on a web-based dashboard; and displaying a performance indicator for the educational institution indicative of the relative performance of the educational institution relative to the plurality of educational institutions based on the career readiness index of the plurality of students.

Clause 2. The method of clause 1, where the plurality of educational institutions includes at least 10 universities.

Clause 3. The method of clause 1, where the plurality of students includes as least 100 students.

Clause 4. The method of clause 1, where the plurality of students are students of the educational institution.

Clause 5. The method of clause 1, where each norm group includes at least 1000 students.

Clause 6. The method of clause 1, where the career assessment database includes at least 75 norm groups.

Clause 7. The method of clause 1, where the student assessment database includes a plurality of databases, each of the plurality of databases corresponding to a respective norm group.

In some embodiments, the exemplary computer-implemented method may include at least the following steps of: generating, by at least one processor, a student profile in an educational institution database for each student of a plurality of students associated with an educational institution; where each student profile includes: i) an employment position field identifying an employment position, ii) a career readiness (CR) survey field for storing a CR survey identifier identifying a CR survey, iii) a norm group field for storing a norm group identifier identifying a norm group, and iv) a numeric rating field for storing a numeric rating data entry representing a numeric rating; determining, by at least one processor, the CR survey identifier and the norm group identifier for each student profile based on the CR survey and the norm group associated with the employment position field; transmitting, by at least one processor, the CR survey associated with each CR survey identifier of each student profile to at least one evaluator for each student; where the CR survey includes a plurality of data fields associated with a plurality of behavioral item questions for receiving a rating data entry in each data field of the plurality of data fields for each behavioral item question of the plurality of behavioral item questions; receiving, by at least one processor, a rating for each behavioral item question of the plurality of behavioral item questions in the CR survey from the rating data entry in each data field of the plurality of data fields by the at least one evaluator of each student; generating, by at least one processor, a numeric rating associated with each student profile based on an aggregation of the rating for each behavioral item question in the CR survey from each evaluator; transmitting, by at least one processor, each student profile to a student assessment database, each student profile including the employment position associated with each student profile and the numeric rating associated with each student profile; where the student assessment database is configured to aggregate the student profile of each student of the plurality of students with additional student profiles from a plurality of an educational institutions into respective norm groups and determine a percentile rank of each student profile and each additional student profile within each respective norm group according to each numeric rating of each student profile and each additional student profile; receiving, by at least one processor, at the educational institution database the percentile rank of each student profile of each student associated with the educational institution from the student assessment database; determining, by at least one processor, a response rate for each student profile based on a number of responding evaluators of the at least one evaluator; generating, by at least one processor, a personalized career readiness index for each student profile based on the response rate, the percentile rank and the numeric rating associated with each student profile to measure a career-specific metric of career readiness; causing to display, by at least one processor, the career readiness index of one or more student profiles associated with one or more students of the plurality of students to a user on a web-based dashboard; and causing to display, by at least one processor, a performance indicator for the educational institution indicative of the relative performance of the educational institution relative to the plurality of educational institutions based on the career readiness index of the plurality of students.

In some embodiments, the exemplary computer-implemented method may include at least the following steps of: receiving, by at least one processor associated with a student assessment database, each student profile of a plurality of student profiles from a plurality of educational institution databases; where each student profile includes: i) an employment position field storing an employment position identifier identifying an employment position, ii) a CR survey field storing a CR survey identifier identifying a CR survey associated with the employment position identifier, iii) a norm group field storing a norm group identifier identifying a norm group associated with the employment position identifier, and iv) a numeric rating field storing a numeric rating data entry representing a numeric rating; where the CR survey includes a plurality of data fields associated with a plurality of behavioral item questions for receiving a rating data entry in each data field of the plurality of data fields for each behavioral item question of the plurality of behavioral item questions; where a rating for each behavioral item question of the plurality of behavioral item questions in the CR survey includes the rating data entry in each data field of the plurality of data fields by the at least one evaluator of each student; where the numeric rating associated with each student profile includes an aggregation of the rating for each behavioral item question in the CR survey from each evaluator; determining, by the at least one processor, a percentile rank of each student profile from each educational institution database of the plurality of educational institution databases within each respective norm group according to each numeric rating of each student profile; transmitting, by at least one processor, the percentile rank of each respective student profile to a respective educational institution database of the plurality of educational institution databases associated with each respective student profile.

In some embodiments, the exemplary computer system may include at least the following component of: an educational institution database storing a student profile for each student of a plurality of students associated with an educational institution; at least one processor configured to implement software instructions causing the at least one processor to perform steps to: generate the student profile for each student of the plurality of students associated with the educational institution; where each student profile includes: i) an employment position field identifying an employment position, ii) a CR survey field for storing a CR survey identifier identifying a CR survey, iii) a norm group field for storing a norm group identifier identifying a norm group, and iv) a numeric rating field for storing a numeric rating data entry representing a numeric rating; determine the CR survey identifier and the norm group identifier for each student profile based on the CR survey and the norm group associated with the employment position field; transmit the CR survey associated with each CR survey identifier of each student profile to at least one evaluator for each student; where the CR survey includes a plurality of data fields associated with a plurality of behavioral item questions for receiving a rating data entry in each data field of the plurality of data fields for each behavioral item question of the plurality of behavioral item questions; receive a rating for each behavioral item question of the plurality of behavioral item questions in the CR survey from the rating data entry in each data field of the plurality of data fields by the at least one evaluator of each student; generate a numeric rating associated with each student profile based on an aggregation of the rating for each behavioral item question in the CR survey from each evaluator; transmit each student profile to a student assessment database, each student profile including the employment position associated with each student profile and the numeric rating associated with each student profile; where the student assessment database is configured to aggregate the student profile of each student of the plurality of students with additional student profiles from a plurality of universities into respective norm groups and determine a percentile rank of each student profile and each additional student profile within each respective norm group according to each numeric rating of each student profile and each additional student profile; receive at the educational institution database the percentile rank of each student profile of each student associated with the educational institution from the student assessment database; determine a response rate for each student profile based on a number of responding evaluators of the at least one evaluator; generate a personalized career readiness index for each student profile based on the response rate, the percentile rank and the numeric rating associated with each student profile to measure a career-specific metric of career readiness; cause to display the career readiness index of one or more student profiles associated with one or more students of the plurality of students to a user on a web-based dashboard; and cause to display a performance indicator for the educational institution indicative of the relative performance of the educational institution relative to the plurality of educational institutions based on the career readiness index of the plurality of students.

In some embodiments, each behavioral item question includes one or more career specific behavioral item question variations from a library of behavioral item questions.

In some embodiments, each behavioral item question includes: one or more behavioral item questions determined from the library of behavioral item questions for each core competency categorization of a set of core competency categorizations associated with each CR survey; and the one or more career specific behavioral item question variations generated from each respective one or more behavioral item questions associated with each CR survey.

In some embodiments, one or more career specific behavioral item question variations are determined from a library of behavioral item questions; and the CR survey is generated from the one or more career-specific behavioral item question variations.

In some embodiments, a set of core competency categorizations associated with each CR survey is determined; one or more behavioral item questions from the library of behavioral item questions for each core competency categorization of the set of core competency categorizations associated with each CR survey are determined; and the one or more career specific behavioral item question variations for each respective one or more behavioral item questions associated with each CR survey.

In some embodiments, an average rating for each CR survey for each student based at least in part on an average of each rating in each CR survey for each evaluator of the at least one evaluator may be determined; and an average numeric rating based on an average of the average rating across each CR survey may be determined.

In some embodiments, the student assessment database may include a plurality of databases, each of the plurality of databases corresponding to a respective norm group.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein may be utilized in any combination with each other. Further still, the various steps may be carried out in any desired order (and any desired steps may be added and/or any desired steps may be eliminated).

What is claimed is:

1. A system comprising:
an aggregation database in communication with a plurality of entity-specific databases;
  wherein the aggregation database has an aggregation database schema that enables the aggregation database to:
    employ permissions to allow to access data of each entity-specific database of the plurality entity-specific databases via an entity-specific secure connection specific to each entity-specific database, and
    return to each respective entity-specific database via the entity-specific secure connection specific to each respective entity-specific database, only the data received from each respective entity-specific database without sharing the data between each other entity-specific database;
  wherein each respective entity-specific database comprises a respective entity-specific database schema configured with permissions according to a respective particular database model of each respective entity;
  wherein the plurality of entity-specific databases comprises:
    at least one first entity-specific database associated with a first educational institution and comprising a first entity specific database schema,
    at least one second entity-specific database associated with a second educational institution and comprising a second entity specific database schema, and
    at least one third entity-specific database associated with a third educational institution and comprising a third entity specific database schema;
  wherein the at least one first entity-specific database, the at least one second entity-specific database and the at least one third entity-specific database are distinct entity-specific databases;
  wherein the first educational institution, the second educational institution and third educational institution are distinct educational institutions; and at least one processor in communication with the aggregation database, wherein the at least one processor is configured to execute software instructions which, upon execution, cause the at least one processor to:
receive, from the at least one first entity-specific database, at least one first user profile associated with at least one first user;
wherein the at least one first user profile comprises:
a first entity identifier identifying the first educational institution, and
at least one first metric associated with the at least one first user;
receive, from the at least one second entity-specific database, at least one second user profile associated with at least one second user;
wherein the at least one second user profile comprises:
a second entity identifier identifying the second educational institution, and
at least one second metric associated with the at least one second user;
receive, from the at least one third entity-specific database, at least one third user profile associated with at least one third user;
wherein the at least one third user profile comprises:
a third entity identifier identifying the third educational institution, and
at least one third metric associated with the at least one third user;
determine at least one group associated with the at least one first user profile, the at least one second user profile and the at least one third user profile based at least in part on the at least one first metric, the at least one second metric and the at least one third metric;
determine, anonymously within the at least one group, based at least in part on the at least one first metric, the at least one second metric and the at least one third metric:
at least one first user profile rank associated with the at least one first user profile relative to the at least one group,
at least one second user profile rank associated with the at least one second user profile relative to the at least one group, and
at least one third user profile rank associated with the at least one third user profile relative to the at least one group;
determine, anonymously, at least one anonymized first user profile percentile rank associated with the at least one first user profile based at least in part on:
the at least one first user profile rank,
at least one second user profile rank, and
at least one third user profile rank;
determine, anonymously, at least one anonymized second user profile percentile rank associated with the at least one second user profile based at least in part on:
the at least one first user profile rank,
at least one second user profile rank, and
at least one third user profile rank;
determine, anonymously, at least one anonymized third user profile percentile rank associated with the at least one third user profile based at least in part on:
the at least one first user profile rank,
at least one second user profile rank, and
at least one third user profile rank;
modify the at least one first user profile to obtain at least one updated first user profile comprising the at least one anonymized first user profile percentile rank associated with the at least one first user profile;
modify the at least one second user profile to obtain at least one updated second user profile comprising the at least one anonymized second user profile percentile rank associated with the at least one second user profile;
modify the at least one third user profile to obtain at least one updated third user profile comprising the at least one anonymized third user profile percentile rank associated with the at least one third user profile;
allow to access, based at least in pan on the permissions of the first entity specific database schema, the at least one updated first user profile, the at least one anonymized second user profile percentile rank, and the at least one anonymized third user profile percentile rank to the at least one first entity-specific database via a first entity-specific secure connection so as to provide to the first entity the at least one first user profile percentile rank that ranks the at least one first user relative to the plurality of entity-specific databases;
allow to access, based at least in part on the permissions of the second entity specific database schema, the at least one updated second user profile, the at least one anonymized first user profile percentile rank, and the at least one anonymized third user profile percentile rank to the at least one second entity-specific database via a second entity-specific secure connection so as to provide to the second entity the at least one second user profile percentile rank that ranks the at least one second user relative to the plurality of entity-specific databases; and
allow to access, based at least in part on the permissions of the third entity specific database schema, the at least one updated third user profile, the at least one anonymized first user profile percentile rank, and the at least one anonymized second user profile percentile rank to the at least one third entity-specific database via a third entity-specific secure connection so as to provide to the third entity the at least one third user profile percentile rank that ranks the at least one third user relative to the plurality of entity-specific databases.

2. The system of claim 1, wherein:
the at least one first metric comprises a first set of scores associated with the at least one group;
the at least one second metric comprises a second set of scores associated with the at least one group; and
the at least one third metric comprises a third set of scores associated with the at least one group.

3. The system of claim 2, wherein the at least one processor is configured to execute software instructions which, upon execution, further cause the at least one processor to:
determine at least one first average score for the at least one first user profile based at least in part on the first set of scores;
determine at least one second average score for the at least one second user profile based at least in part on the second set of scores;
determine at least one third average score for the at least one third user profile based at least in part on the third set of scores; and determine, within the at least one group, based at least in part on the at least one first average score, the at least one second average score and the at least one third average score:
- the at least one first user profile rank associated with the at least one first user profile relative to the at least one group,
- the at least one second user profile rank associated with the at least one second user profile relative to the at least one group, and
- the at least one third user profile rank associated with the at least one third user profile relative to the at least one group.

4. The system of claim 1, wherein the at least one processor is configured to execute software instructions which, upon execution, further cause the at least one processor to cleanse the at least one first user profile, the at least one second user profile and the at least one third user profile of user-identifying information.

5. The system of claim 1, wherein the at least one processor is configured to execute software instructions which, upon execution, further cause the at least one processor to:
- generate at least one first normalized metric for the at least one first user profile in the at least one group based at least in part on the at least one first metric, the at least one second metric and the at least one third metric;
- generate at least one second normalized metric for the at least one second user profile in the at least one group based at least in part on the at least one first metric, the at least one second metric and the at least one third metric; and
- generate at least one third normalized metric for the at least one third user profile in the at least one group based at least in part on the at least one first metric, the at least one second metric and the at least one third metric.

6. The system of claim 1, wherein the at least one processor is configured to execute software instructions which, upon execution, further cause the at least one processor to:
- determine a number of user profiles in the at least one group; and
- generate a plurality of sub-groups in place of the at least one group based upon the number of user profiles of the at least one group exceeding a threshold quantity.

7. The system of claim 6, wherein the at least one processor is configured to execute software instructions which, upon execution, further cause the at least one processor to determine the threshold quantity based at least in part on statistical significance test.

8. The system of claim 1, wherein each entity-specific secure connection comprises a cryptographically permissioned communication channel.

9. The system of claim 1, wherein:
- the at least one first metric of the at least one first user profile comprises a first rating for each evaluation question of a first plurality of evaluation questions in a first evaluator survey by at least one first evaluator of the at least one first user profile;
- the at least one second metric of the at least one second user profile comprises a second rating for each evaluation question of a second plurality of evaluation questions in a second evaluator survey by at least one second evaluator of the at least one second user profile; and
- the at least one third metric of the at least one third user profile comprises a third rating for each evaluation question of a third plurality of evaluation questions in a third evaluator survey by at least one third evaluator of the at least one third user profile.

10. The system of claim 9, wherein the first plurality of evaluation questions, the second plurality of evaluation questions and the third plurality of evaluation questions are associated with a career readiness evaluation of each of:
- at least one first student associated with the at least one first user profile,
- at least one second student associated with the at least one second user profile, and
- at least one third student associated with the at least one third user profile.

11. A method comprising:
- receiving, by at least one processor of an aggregation database, from at least one first entity-specific database of a plurality of entity-specific databases, at least one first user profile associated with at least one first user;
- wherein the at least one first user profile comprises:
  - a first entity identifier identifying a first entity, and
  - at least one first metric associated with the at least one first user;
- wherein the aggregation database has an aggregation database schema that enables the aggregation database to:
  - employ permissions to allow to access data of each entity-specific database of the plurality entity-specific databases via an entity-specific secure connection specific to each entity-specific database, and
  - return to each respective entity-specific database via the entity-specific secure connection specific to each respective entity-specific database, only the data received from each respective entity-specific database without sharing the data between each other entity-specific database:
- wherein each respective entity-specific database comprises a respective entity-specific database schema configured with permissions according to a respective particular database model of each respective entity;
- wherein the plurality of entity-specific databases comprises:
  - the at least one first entity-specific database associated with the first educational institution and comprising a first entity specific database schema,
  - at least one second entity-specific database associated with a second educational institution and comprising a second entity specific database schema, and
  - at least one third entity-specific database associated with a third educational institution and comprising a third entity specific database schema;
- wherein the at least one first entity-specific database, the at least one second entity-specific database and the at least one third entity-specific database are distinct entity-specific databases;
- wherein the first educational institution, the second educational institution and third educational institution are distinct educational institution; and
- receiving, by the at least one processor, from the at least one second entity-specific database, at least one second user profile associated with at least one second user;
- wherein the at least one second user profile comprises:

a second entity identifier identifying the second educational institution, and
at least one second metric associated with the at least one second user;
receiving, by the at least one processor, from the at least one third entity-specific database, at least one third user profile associated with at least one third user;
wherein the at least one third user profile comprises:
a third entity identifier identifying the third educational institution, and
at least one third metric associated with the at least one third user;
determining, by the at least one processor, at least one group associated with the at least one first user profile, the at least one second user profile and the at least one third user profile based at least in part on the at least one first metric, the at least one second metric and the at least one third metric;
determining, anonymously within the at least one group, by the at least one processor, based at least in part on the at least one first metric, the at least one second metric and the at least one third metric:
at least one first user profile rank associated with the at least one first user profile relative to the at least one group,
at least one second user profile rank associated with the at least one second user profile relative to the at least one group, and
at least one third user profile rank associated with the at least one third user profile relative to the at least one group;
determining, by the at least one processor, anonymously at least one anonymized first user profile percentile rank associated with the at least one first user profile based at least in part on:
the at least one first user profile rank,
at least one second user profile rank, and
at least one third user profile rank;
determining, by the at least one processor, anonymously at least one anonymized second user profile percentile rank associated with the at least one second user profile based at least in part on:
the at least one first user profile rank,
at least one second user profile rank, and
at least one third user profile rank;
determining, by the at least one processor, anonymously at least one anonymized third user profile percentile rank associated with the at least one third user profile based at least in part on:
the at least one first user profile rank,
at least one second user profile rank, and
at least one third user profile rank;
modifying, by the at least one processor, the at least one first user profile to obtain at least one updated first user profile comprising the at least one anonymized first user profile percentile rank associated with the at least one first user profile;
modifying, by the at least one processor, the at least one second user profile to obtain at least one updated second user profile comprising the at least one anonymized second user profile percentile rank associated with the at least one second user profile;
modifying, by the at least one processor, the at least one third user profile to obtain at least one updated third user profile comprising the at least one anonymized third user profile percentile rank associated with the at least one third user profile;

allowing to access, based at least in part on the permissions of the first entity specific database schema, by the at least one processor, the at least one updated first user profile, the at least one anonymized second user profile percentile rank, and the at least one anonymized third user profile percentile rank to the at least one first entity-specific database so as to provide to the first entity the at least one first user profile percentile rank that ranks the at least one first user relative to the plurality of entity-specific databases;
allowing to access, based at least in part on the permissions of the second entity specific database schema, by the at least one processor, the at least one updated second user profile, the at least one anonymized first user profile percentile rank, and the at least one anonymized third user profile percentile rank to the at least one second entity-specific database so as to provide to the second entity the at least one second user profile percentile rank that ranks the at least one second user relative to the plurality of entity-specific databases; and
allowing to access, based at least in part on the permissions of the third entity specific database schema, by the at least one processor, the at least one updated third user profile, the at least one anonymized first user profile percentile rank, and the at least one anonymized second user profile percentile rank to the at least one third entity-specific database so as to provide to the third entity the at least one third user profile percentile rank that ranks the at least one third user relative to the plurality of entity-specific databases.

12. The method of claim 11, wherein:
the at least one first metric comprises a first set of scores associated with the at least one group;
the at least one second metric comprises a second set of scores associated with the at least one group; and
the at least one third metric comprises a third set of scores associated with the at least one group.

13. The method of claim 12, further comprising:
determining, by the at least one processor, at least one first average score for the at least one first user profile based at least in part on the first set of scores;
determining, by the at least one processor, at least one second average score for the at least one second user profile based at least in part on the second set of scores;
determining, by the at least one processor, at least one third average score for the at least one third user profile based at least in part on the third set of scores; and
determining, by the at least one processor, within the at least one group, based at least in part on the at least one first average score, the at least one second average score and the at least one third average score:
the at least one first user profile rank associated with the at least one first user profile relative to the at least one group,
the at least one second user profile rank associated with the at least one second user profile relative to the at least one group, and
the at least one third user profile rank associated with the at least one third user profile relative to the at least one group.

14. The method of claim 11, further comprising cleansing, by the at least one processor, the at least one first user profile, the at least one second user profile and the at least one third user profile of user-identifying information.

15. The method of claim 11, further comprising:
generating, by the at least one processor, at least one first normalized metric for the at least one first user profile in the at least one group based at least in part on the at least one first metric, the at least one second metric and the at least one third metric;

generating, by the at least one processor, at least one second normalized metric for the at least one second user profile in the at least one group based at least in part on the at least one first metric, the at least one second metric and the at least one third metric; and generating, by the at least one processor, at least one third normalized metric for the at least one third user profile in the at least one group based at least in part on the at least one first metric, the at least one second metric and the at least one third metric.

16. The method of claim 11, further comprising:
determining, by the at least one processor, a number of user profiles in the at least one group; and
generating, by the at least one processor, a plurality of sub-groups in place of the at least one group based upon the number of user profiles of the at least one group exceeding a threshold quantity.

17. The method of claim 16, further comprising determining, by the at least one processor, the threshold quantity based at least in part on statistical significance test.

18. The method of claim 11, wherein each entity-specific secure connection comprises a cryptographically permissioned communication channel.

19. The method of claim 11, wherein:
the at least one first metric of the at least one first user profile comprises a first rating for each evaluation question of a first plurality of evaluation questions in a first evaluator survey by at least one first evaluator of the at least one first user profile;
the at least one second metric of the at least one second user profile comprises a second rating for each evaluation question of a second plurality of evaluation questions in a second evaluator survey by at least one second evaluator of the at least one second user profile; and
the at least one third metric of the at least one third user profile comprises a third rating for each evaluation question of a third plurality of evaluation questions in a third evaluator survey by at least one third evaluator of the at least one third user profile.

20. The method of claim 19, wherein the first plurality of evaluation questions, the second plurality of evaluation questions and the third plurality of evaluation questions are associated with a career readiness evaluation of each of:
at least one first student associated with the at least one first user profile,
at least one second student associated with the at least one second user profile, and
at least one third student associated with the at least one third user profile.

* * * * *